US010267956B2

(12) United States Patent
Arbabi et al.

(10) Patent No.: US 10,267,956 B2
(45) Date of Patent: Apr. 23, 2019

(54) MULTI-WAVELENGTH OPTICAL DIELECTRIC METASURFACES

(71) Applicant: CALIFORNIA INSTITUTE OF TECHNOLOGY, Pasadena, CA (US)

(72) Inventors: Ehsan Arbabi, Pasadena, CA (US); Amir Arbabi, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 347 days.

(21) Appl. No.: 15/096,615

(22) Filed: Apr. 12, 2016

(65) Prior Publication Data

US 2016/0306079 A1  Oct. 20, 2016

Related U.S. Application Data

(60) Provisional application No. 62/147,392, filed on Apr. 14, 2015.

(51) Int. Cl.
*G02B 5/02* (2006.01)
*G02B 13/20* (2006.01)
(Continued)

(52) U.S. Cl.
CPC .......... *G02B 5/0226* (2013.01); *G02B 1/002* (2013.01); *G02B 5/0263* (2013.01);
(Continued)

(58) Field of Classification Search
CPC ... G02B 1/005; B02B 6/122; G02F 2202/022; G02F 2202/32; G02F 1/0131;
(Continued)

(56) References Cited

U.S. PATENT DOCUMENTS 8,994,059 B2  3/2015  Huh et al.
9,054,424 B1  6/2015  Hunt et al.
(Continued)

FOREIGN PATENT DOCUMENTS

KR  1020140113553 A  9/2014
WO  2016/140720 A2  9/2016
WO  2017/176921 A1  10/2017

OTHER PUBLICATIONS

"Complete Control of Polarization and Phase of Light with High Efficiency and Sub-wavelength Spatial Resolution" A. Arbabi et al., Nov. 2014, https://www.researchgate.net/publication/267983281.*
(Continued)

*Primary Examiner* — William R Alexander
*Assistant Examiner* — Tamara Y. Washington
(74) *Attorney, Agent, or Firm* — Steinfl + Bruno, LLP

(57) ABSTRACT

Structures for scattering light at multiple wavelengths are disclosed. Scattering elements are fabricated with different geometric dimensions and arrangements, to scatter or focus light at the same focal distance for each wavelength, or at different focal distances according to the desired application. Scattering elements can be circular or elliptical posts, allowing polarization dependent scattering. The elements can have different orientations to scatter light from multiple wavelengths at the desired focal length.

18 Claims, 16 Drawing Sheets

(51) Int. Cl.
  *G02B 1/00* (2006.01)
  *G02B 5/18* (2006.01)
  *G02B 27/00* (2006.01)
  *G02B 27/42* (2006.01)

(52) U.S. Cl.
  CPC .......... *G02B 5/0268* (2013.01); *G02B 5/1876* (2013.01); *G02B 27/0025* (2013.01); *G02B 27/4211* (2013.01)

(58) Field of Classification Search
  CPC ...... G02F 1/0128; G02F 1/01708; G02F 1/01; G01L 1/00
  USPC ........................................................ 359/240
  See application file for complete search history.

(56) References Cited

U.S. PATENT DOCUMENTS

| | | | |
|---|---|---|---|
| 9,385,435 | B2 | 7/2016 | Bily et al. |
| 9,448,305 | B2 | 9/2016 | Bowers et al. |
| 9,450,310 | B2 | 9/2016 | Bily et al. |
| 9,482,796 | B2 | 11/2016 | Arbabi et al. |
| 9,507,064 | B2 | 11/2016 | Brongersma et al. |
| 9,618,680 | B2 | 4/2017 | Baker et al. |
| 9,711,852 | B2 | 7/2017 | Chen et al. |
| 9,733,545 | B2 | 8/2017 | Belkin et al. |
| 9,806,414 | B2 | 10/2017 | Chen et al. |
| 9,806,415 | B2 | 10/2017 | Chen et al. |
| 9,806,416 | B2 | 10/2017 | Chen et al. |
| 9,812,779 | B2 | 11/2017 | Chen et al. |
| 2003/0169504 | A1 | 9/2003 | Kaminsky et al. |
| 2003/0170442 | A1 | 9/2003 | Kaminsky et al. |
| 2003/0175004 | A1 | 9/2003 | Garito et al. |
| 2003/0176777 | A1 | 9/2003 | Muller-Dethlefs |
| 2005/0062928 | A1 | 3/2005 | Yau et al. |
| 2005/0203364 | A1 | 9/2005 | Monfre et al. |
| 2007/0019306 | A1* | 1/2007 | Wu ................. B82Y 30/00 359/811 |
| 2007/0060806 | A1 | 3/2007 | Hunter et al. |
| 2008/0161194 | A1* | 7/2008 | Turner ............... G01N 21/00 506/4 |
| 2008/0186483 | A1 | 8/2008 | Kiesel et al. |
| 2008/0219027 | A1 | 9/2008 | Bourdelais et al. |
| 2009/0250110 | A1* | 10/2009 | Yu ................... H01L 31/02168 136/257 |
| 2010/0252721 | A1 | 10/2010 | Xu |
| 2011/0105867 | A1 | 5/2011 | Schultz et al. |
| 2011/0141541 | A1 | 6/2011 | Bratkovski |
| 2011/0210459 | A1 | 9/2011 | Bille |
| 2012/0038915 | A1 | 2/2012 | Tsuchida et al. |
| 2012/0082863 | A1* | 4/2012 | Ohta .................. G02B 1/105 428/522 |
| 2013/0208332 | A1 | 8/2013 | Yu et al. |
| 2014/0085693 | A1 | 3/2014 | Mosallaei et al. |
| 2014/0146390 | A1* | 5/2014 | Kaempfe ............ G02B 5/1809 359/485.01 |
| 2014/0167022 | A1* | 6/2014 | Huh ................... H01L 51/5275 257/40 |
| 2014/0264998 | A1* | 9/2014 | Smith ............... H01L 31/02366 264/104 |
| 2014/0277433 | A1 | 9/2014 | Pugh et al. |
| 2014/0277436 | A1 | 9/2014 | Pugh et al. |
| 2015/0117032 | A1 | 4/2015 | Hu et al. |
| 2015/0124480 | A1 | 5/2015 | Baker et al. |
| 2015/0219806 | A1 | 8/2015 | Arbabi et al. |
| 2016/0025914 | A1 | 1/2016 | Brongersma et al. |
| 2016/0041095 | A1 | 2/2016 | Rothberg et al. |
| 2016/0313477 | A1 | 10/2016 | Orenstein et al. |
| 2017/0010483 | A1 | 1/2017 | Fainman et al. |
| 2017/0030773 | A1 | 2/2017 | Han et al. |
| 2017/0045652 | A1 | 2/2017 | Arbabi et al. |
| 2017/0097558 | A1 | 4/2017 | Belkin et al. |
| 2017/0195652 | A1 | 7/2017 | Du et al. |
| 2017/0195659 | A1 | 7/2017 | Du et al. |
| 2017/0212285 | A1 | 7/2017 | Arbabi et al. |
| 2017/0250577 | A1 | 8/2017 | Ho et al. |
| 2017/0351111 | A1 | 12/2017 | Jeong et al. |
| 2018/0006376 | A1 | 1/2018 | Black et al. |

OTHER PUBLICATIONS

Aieta, F. et al., "Aberrations of Flat Lenses and Aplanatic Metasurfaces.", Optics Express, vol. 21, No. 25, pp. 31530-31539, (2013).

Aieta, F. et al., "Aberrations-Free Ultrathin Flat Lenses and Axicons at Telecom Wavelengths Based on Plasmonic Metasurfaces.", Nano Lett., 12, pp. 4932-4936, (2012).

Aieta, F. et al., "Multiwavelength Achromatic Metasurfaces by Dispersive Phase Compensation.", Science, vol. 347, Issue 6228, pp. 1342-1345, (2015), 5 pages.

Arbabi, A. et al., "Complete Control of Polarization and Phase of Light with High Efficiency and Sub-Wavelength Spatial Resolution.", arXiv:1411.1494 Physics Optics, 10 pages, (2014).

Arbabi, A. et al., "Controlling the Phase Front of Optical Fiber Beams using High Contrast Metastructures.", CLEO, 2 pages, (2014).

Arbabi, A. et al., "Dielectric Metasurfaces for Complete Control of Phase and Polarization with Subwavelength Spatial Resolution and High Transmission.", Nat. Nanotech., 28 pages, (2015).

Arbabi, A. et al., "Efficient High NA Flat Micro-Lenses Realized Using High Contrast Transmitarrays.", Proc. SPIE, 7 pages, (2015).

Arbabi, A. et al., "Fundamental Limits of Ultrathin Metasurfaces.", arXiv:1411.2537, 6 pages, (2014).

Arbabi, A. et al., "Highly Efficient Polarization Control Using Subwavelength High Contrast Transmitarrays.", Proc. SPIE 9372, High Contrast Metasurfaces IV, (2015), 7 pages.

Arbabi, A. et al., "Subwavelength-Thick Lenses with High Numerical Apertures and Large Efficiency Based on High-Contrast Transmitarrays.", Nature Commun., 6:7069, 6 pages, (2015).

Arbabi, A. et al., "Subwavelength-Thick Lenses with High Numerical Apertures and Large Efficiency Based on High-Contrast Transmitanays.", arXiv:1410.8261 Physics Optics, 10 pages, (2014).

Astilean, S. et al., "High-Efficiency Subwavelength Diffractive Element Patterned in a High-Refractive-Index Material for 633nm.", Optics Letters, vol. 23, No. 7, pp. 552-554, 4 pages, (1998).

Bennett, S.J., "Achromatic Combinations of Hologram Optical Elements.", Applied Optics, vol. 15, No. 2, pp. 542-545, (1976).

Buralli, D.A. et al., "Some Fundamental Limitations of Achromatic Holographic Systems.", J. Opt. Soc. Am. A., vol. 6, No. 12, pp. 1863-1868, (1989).

Cheng, J. et al., "Truly Achromatic Optical Metasurfaces: A Filter Circuit Theory-Based Design.", J. Opt. Soc. Am. B, vol. 32, No. 10, pp. 2115-2121, (2015).

Di Falco, A. et al., "Flexible metamaterials at visible wavelengths.", New J. Phys. 12, 113006, 8 pages, (2010).

Eisenbach, O. et al., "Metasurfaces Based Dual Wavelength Diffractive Lenses.", Optics Express, vol. 23, No. 4, pp. 3928-3936, (2015).

Ergin, T. et al., "Three-Dimensional Invisibility Cloak at Optical Wavelengths.", Science, vol. 328, pp. 337-339, 4 pages, (2010).

Fan, P. et al., "An Invisible Metal-Semiconductor Photodetector.", Nature Photonics, vol. 6, pp. 380-385, (2012).

Fattal, D. et al., "Flat Dielectric Grating Reflectors with Focusing Abilities.", Nat. Photon. 4, pp. 466-470, (2010).

He, J. et al., "Inorganic Materials and Assembly Techniques for Flexible and Stretchable Electronics.", Proc. IEEE, vol. 103, No. 4, pp. 619-632, (2015).

Karimi, E. et al., "Generating Optical Orbital Angular Momentum at Visible Wavelengths Using a Plasmonic Metasurface.", Light Sci. Appl. 3, e167, 4 pages, (2014).

Khorasaninejad, M. et al., "Achromatic Metasurface Lens at Telecommunication Wavelengths.", Nano Lett., 15, pp. 5358-5362, 5 pages, (2015).

Kildishev, A. V. et al., "Planar Photonics with Metasurfaces.", Science 339, 1232009, 9 pages, (2013).

(56) References Cited

OTHER PUBLICATIONS

Knapp, D.J., "Fundamentals of Conformal Dome Design.", International Optical Design Conference, Proceedings of SPIE, vol. 4832, pp. 394-409, (2002), 17 pages.
Lalanne, P. et al., "Design and Fabrication of Blazed Binary Diffractive Elements with Sampling Periods Smaller than the Structural Cutoff.", J. Opt. Soc. Am. A, vol. 16, No. 5, pp. 1143-1156, (1999).
Latta, J.H., "Analysis of Multiple Hologram Optical Elements with Low Dispersion and Low Aberrations.", Applied Optics, vol. 11, No. 8, pp. 1686-1696, (1972).
Lin, D. et al., Dielectric Gradient Metasurface Optical Elements. Science, vol. 345, Issue 6194, 298-302, 6 pages, (2014).
Liu, V. et al., "S4: A Free Electromagnetic Solver for Layered Periodic Structures.", Comput. Phys. Commun. 183, pp. 2233-2244, (2012).
Ni, X. et al., "An Ultrathin Invisibility Skin Cloak for Visible Light.", Science, vol. 349, Issue 6254, pp. 1310-1314, 6 pages, (2015).
Oskooi, A. et al., "MEEP: A Flexible Free-Software Package for Electromagnetic Simulations by the FDTD Method.", Comput. Phys. Commun., vol. 181, pp. 687-702, 30 pages, (2010).
Piggott, A.Y. et al., "Inverse Design and Demonstration of a Compact and Broadband On-Chip Wavelength Demultiplexer.", Nature Photonics, vol. 9, pp. 374-377, (2015), 5 pages.
Pryce, I. et al., "Highly Strained Compliant Optical Metamaterials with Large Frequency Tunability.", Nano Lett. 10, pp. 4222-4227, (2010).
Shao, J. et al., "In Vivo Blood Glucose Quantification Using Raman Spectroscopy.", PLOS One, vol. 7, Issue 10, e48127,6 pages, (2012).
Shannon, R.R., "Overview of Conformal Optics.", Proc. SPIE 3705, Window and Dome Technologies and Materials VI, pp. 180-188, (1999), 11 pages.
Swanson, G.J., "Binary Optics Technology: The Theory and Design of Multi-Level Diffractive Optical Elements.", Technical Report 854, DTIC Document, 53 pages, (1989).
Sweatt, W.C., "Achromatic Triplet Using Holographic Optical Elements.", Applied Optics, vol. 16, No. 5, pp. 1390-1391, (1977).
Teo, J. et al., "Controlling Electromagnetic Fields at Boundaries of Arbitrary Geometries.", arXiv preprint arXiv:1509.06175, 11 pages, (2015).
Thompson, K. P. et al., "Freeform Optical Surfaces: A Revolution in Imaging Optical Design.", Opt. Photon. News 23, pp. 30-35, (2012).
Valentine, J. et al., "An Optical Cloak made of Dielectrics.", Nat. Mater., vol. 8, pp. 568-571, (2009).
Viventi, J. et al., "Flexible, Foldable, Actively Multiplexed, High-Density Electrode Array for Mapping Brain Activity In Vivo.", Nat. Neurosci. 14(12), pp. 1599-1605, 20 pages, (2011).
Vo, S. et al., "Sub-Wavelength Grating Lenses with a Twist.", IEEE Photon. Technol. Lett., vol. 26, No. 13, pp. 1375-1378, (2014).
Walia, S. et al., "Flexible Metasurfaces and Metamaterials: A Review of Materials and Fabrication Processes at Micro- and Nano-Scales.", Appl. Phys. Rev. 2, 011303, 16 pages, (2015).
Wang, Y. et al., "Achromatic Fresnel Optics for Wideband Extreme-Ultraviolet and X-Ray Imaging.", Nature, vol. 424, pp. 50-53, (2003).
Wang, C. et al., "User-Interactive Electronic Skin for Instantaneous Pressure Visualization.", + Supplementary Information, Nat. Mater., vol. 12, pp. 899-904, 23 pages, (2013).
Weingartner, I. et al., "Chromatic Correction of Two-andThree-Element Holographic Imaging Systems.", Optica Acta, vol. 29, No. 4, pp. 519-529, (1982), 15 pages.
Xu, X. et al., "Flexible Visible-Infrared Metamaterials and Their Applications in Highly Sensitive Chemical and Biological Sensing.", Nano Lett. 11, pp. 3232-3238, (2011).
Young, M., "Zone Plates and their Aberrations.", J. Opt. Soc. Am., vol. 62, No. 8, pp. 972-976, (1972).
Yu, N. et al., "Flat Optics with Designer Metasurfaces.", Nat. Mater., vol. 13, pp. 139-150, (2014).
Zheng, G. et al., "Metasurface Holograms Reaching 80% Efficiency.", Nature Nanotechnology, 10, pp. 1-5, (2015), 6 pages.
Zhao, Z. et al., "Multispectral Optical Metasurfaces Enabled by Achromatic Phase Transition.", Scientific Reports, 5:15781, 9 pages, (2015).
Zhu, L. et al., "Flexible Photonic Metastructures for Tunable Coloration.", Optica, vol. 2, No. 3, pp. 255-258, (2015).
Holo/Or, The Early Pioneer of Diffractive Optics Since 1989, Taihei Boeki Co., Ltd., Retrieve:http://www.taiheiboeki.co.jp/product/201111HoloOr-DOE.pdf., Nov. 2011, 27 pages. (Chinese Original + English Translation).
International Search Report for International Application No. PCT/US2016/027086 filed Apr. 12, 2016 on behalf of California Institute of Technology, dated Jul. 20, 2016. 3 pages.
Written Opinion for International Application No. PCT/US2016/027086 filed Apr. 12, 2016 on behalf of California Institute of Technology, dated Jul. 20, 2016. 7 pages.
International Search Report for International Application No. PCT/US2016/027154 filed Apr. 12, 2016 on behalf of California Institute of Technology, dated Jul. 20, 2016. 4 pages.
Written Opinion for International Application No. PCT/US2016/027154 filed Apr. 12, 2016 on behalf of California Institute of Technology, dated Jul. 20, 2016. 5 pages.
International Search Report for International Application No. PCT/US2016/047811 filed Aug. 19, 2016 on behalf of California Institute of Technology, dated Oct. 31, 2016. 8 pages.
Written Opinion for International Application No. PCT/US2016/047811 filed Aug. 19, 2016 on behalf of California Institute of Technology, dated Oct. 31, 2016. 8 pages.
Restriction Requirement for U.S. Appl. No. 15/097,101, filed Apr. 12, 2016 on behalf of California Institute of Technology, dated Aug. 17, 2017. 6 pages.
Notice of Allowance for U.S. Appl. No. 15/097,101, filed Apr. 12, 2016 on behalf of California Institute of Technology, dated Jan. 11, 2018. 8 pages.
Notice of Allowance for U.S. Appl. No. 15/097,101, filed Apr. 12, 2016 on behalf of California Institute of Technology, dated Apr. 20, 2018. 8 pages.
Non-Final Office Action for U.S. Appl. No. 15/241,914, filed Aug. 19, 2016 on behalf of California Institute of Technology, dated Dec. 13, 2017. 12 pages.
Final Office Action for U.S. Appl. No. 15/241,914, filed Aug. 19, 2016 on behalf of California Institute of Technology, dated May 1, 2018. 16 pages.
Non-Final Office Action for U.S. Appl. No. 15/975,521, filed May 9. 2018, on behalf of California Institute of Technology, dated Sep. 18, 2018. 10 pgs.
Staude et al. "Tailoring Directional Scattering through Magnetic and Electric REsonances in Subwavelength Silicon Nanodisks" *ACS Nano, American Chemical Society*.2013. pp. 7824-7832. vol. 7, No. 9, 9 pgs.
West et al. "All-dielectric subwavelength metasurface focusing lens" *Optics Express, The Optical Society*.Oct. 20, 2014. vol. 22, No. 21. 10 pgs.

* cited by examiner

MULTI-WAVELENGTH OPTICAL DIELECTRIC METASURFACES

CROSS REFERENCE TO RELATED APPLICATIONS

The present application claims priority to U.S. Provisional Patent Application No. 62/147,392, filed on Apr. 14, 2015, and may be related to U.S. Provisional Patent Application No. 62/151,531, filed on Apr. 23, 2015, the disclosures of both of which are incorporated herein by reference in their entirety.

STATEMENT OF INTEREST

This invention was made with government support under Grant No. W911NF-14-1-0345 awarded by the Army. The government has certain rights in the invention.

TECHNICAL FIELD

The present disclosure relates to optical scattering. More particularly, it relates to multi-wavelength optical dielectric metasurfaces.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
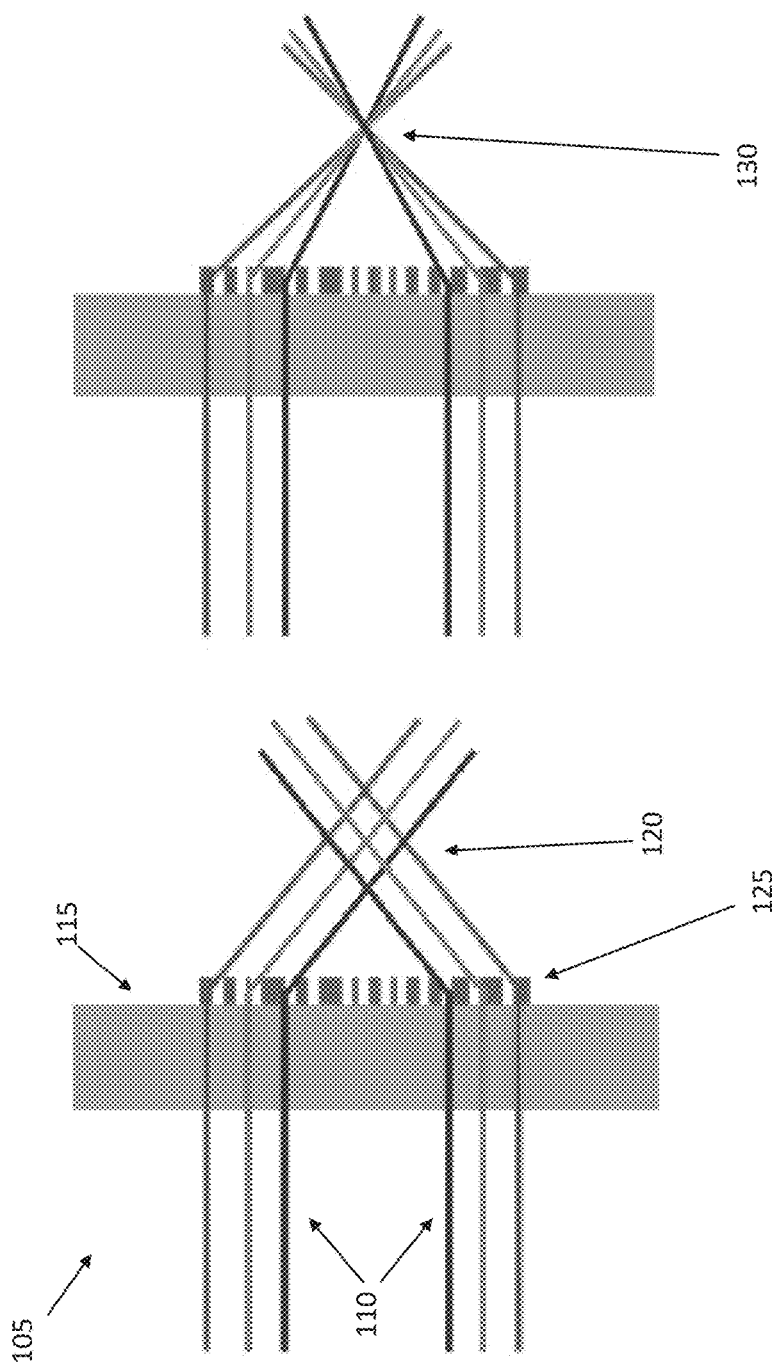
FIG. 1 illustrates an example of a distorted focus compared to a non distorted focus at multiple wavelengths.

In a first aspect of the disclosure, a structure is described, the structure comprising: a substrate; a first plurality of scattering elements on the substrate, the first plurality of scattering elements having first geometrical dimensions for the scattering elements; and a second plurality of scattering elements on the substrate, the second plurality of scattering elements having second geometrical dimensions for the scattering elements, the second geometrical dimensions being different from the first geometrical dimensions.

In a second aspect of the disclosure, a method is described, the method comprising: providing a substrate; fabricating a first plurality of scattering elements on the substrate according to first geometric dimensions, to scatter light at a first wavelength; and fabricating a second plurality of scattering elements on the substrate according to second geometric dimensions, to scatter light at a second wavelength, wherein the first geometric dimensions are different from the second geometric dimensions, and the first wavelength is different from the second wavelength.

DETAILED DESCRIPTION

Optical metasurfaces are structures with subwavelength thicknesses relative to the electromagnetic wavelength range the structures are meant to operate in. In other words, optical metasurfaces are thinner than a wavelength and can therefore shape the amplitude, phase, and polarization of electromagnetic beams. In the present disclosure, reference will be made to the light spectrum specifically, however similar considerations can be valid also for electromagnetic waves outside the light spectrum.

Dielectric metasurfaces are arrays of scattering elements having a high refractive index, the array being on a low refractive index material substrate. Dielectric metasurfaces have shown high versatility and efficiency in various optical functionalities, see Refs. [1-5]. One drawback of these metasurfaces is their limited bandwidth, which stems from their high diffractive chromatic aberration. Therefore, these dielectric metasurfaces are mostly limited to operating at a single wavelength, or close to a single wavelength, and cannot be used towards applications needing multiple wavelength capabilities. In the present disclosure, methods are disclosed for designing multi-wavelength metasurfaces.

Dielectric metasurfaces are composed of a large number of scatterers placed on two dimensional lattices; the scattering phases and amplitudes for the scattering elements are tailored and designed to achieve a desired functionality. In the present disclosure, methods are disclosed for designing multi-wavelength metasurfaces. Some embodiments of the present disclosure are based on dividing the lattice into two or more sub-lattices, and designing the scatterers on each sub-lattice for operation at a specific wavelength. As shown in the present disclosure via examples, these embodiments describe metasurfaces working at two or more wavelengths, simultaneously. In other embodiments, varying several degrees of freedom in the design of the geometry of the scatterers can achieve the desired scattering response at different wavelengths. In yet other embodiments, the two different methods may be applied in conjunction to achieve operation at multiple wavelengths.

As described above, metasurfaces are nanostructured devices composed of arrays of subwavelength scatterers (or meta-atoms) that manipulate the wavefront, polarization, or intensity of light. Similarly to other diffractive optical devices, metasurfaces can suffer from significant chromatic aberrations that limit their bandwidth. In the present disclosure, methods for designing multi-wavelength metasurfaces are described, using unit cells with multiple meta-atoms, or meta-molecules. Transmissive lenses with efficiencies as high as, for example, 72% and numerical apertures as high as, for example, 0.46 simultaneously operating at 915 nm and 1550 nm are possible. With proper scaling, these devices can be used in applications where operation at distinct known wavelengths is required, like various fluorescence microscopy techniques.

Recently, a new wave of interest has risen in nanostructured diffractive optical elements due to advances in nanofabrication technology, see Refs. [1-7]. From the multiple designs proposed so far, dielectric transmit arrays, see Refs.

[7-9], are some of the most versatile metasurfaces because they provide high transmission and subwavelength spatial control of both polarization and phase. Several diffractive optical elements, including high numerical aperture lenses and simultaneous phase and polarization controllers, have recently been demonstrated with high efficiencies, see Refs. [8, 9]. These devices are based on sub-wavelength arrays of high refractive index dielectric nano-resonators (scatterers) with different geometries, fabricated on a planar substrate. Scatterers with various geometries impart different phases to the transmitted light, shaping its wavefront to the desired form.

One main drawback of almost all of metasurface devices, particularly the ones with spatially varying phase profiles like lenses and gratings, is their chromatic aberration: their performance changes as the wavelength is varied, see Refs. [10-12]. Refractive optical elements also suffer from chromatic aberrations, however their chromatic aberrations, which stem from material dispersion, are substantially smaller than those of the diffractive elements, see Refs. [11, 12]. An ideal refractive lens made of a dispersionless material will show no chromatic aberration. On the other hand, the chromatic aberration of diffractive elements mainly comes from the geometrical arrangement of the device. Early efforts focused on making achromatic diffractive lenses by cascading them in the form of doublets and triplets, see Refs. [13-16], but it was later shown that it is fundamentally impossible to make a converging achromatic lens which has a paraxial solution (i.e. is suitable for imaging) by only using diffractive elements, see Ref. [17]. Although diffractive-refractive combinations have successfully been implemented to reduce chromatic aberrations, these are mostly useful in deep UV and X-ray wavelengths where materials are significantly more dispersive, see Refs. [18, 19]. More recently, wavelength and polarization selectivity of metallic meta-atoms have been used to fabricate a Fresnel zone plate lens that operates at two distinct wavelengths with different orthogonal polarizations, see Ref. [20]. Besides undesired multi-focus property of Fresnel zone plates and efficiency limitations of metallic metasurfaces, see Refs. [18, 21, 22], the structure works only with different polarizations at the two wavelengths.

The large phase dispersion of dielectric meta-atoms with multiple resonances has also been exploited to compensate for the phase dispersion of metasurfaces at three wavelengths, see Refs. [23, 24], but the cylindrical lens demonstrated with this technique is polarization-dependent and has low numerical aperture and efficiency. Multi-wavelength metasurfaces based on elliptical apertures in metallic films are demonstrated in Ref. [25], but these are also polarization-dependent and have a multi-focus performance. An achromatic metasurface design is proposed in Ref. [26] based on the idea of dispersionless meta-atoms (i.e. meta-atoms that impart constant delays). However, the design of Ref. [26] only works for metasurface lenses with one Fresnel zone, limiting the size and numerical aperture of the lenses. For a typical lens with tens of Fresnel zones, dispersionless meta-atoms will not reduce the chromatic dispersion as will be discussed below. In the present disclosure, the reason for chromatic dispersion of metasurface lenses is described. Methods for correcting this dispersion at distinct wavelengths are also described. Experimental results demonstrating corrected behavior of a lens realized using the methods of the present disclosure are described in the following.

Figure 11:
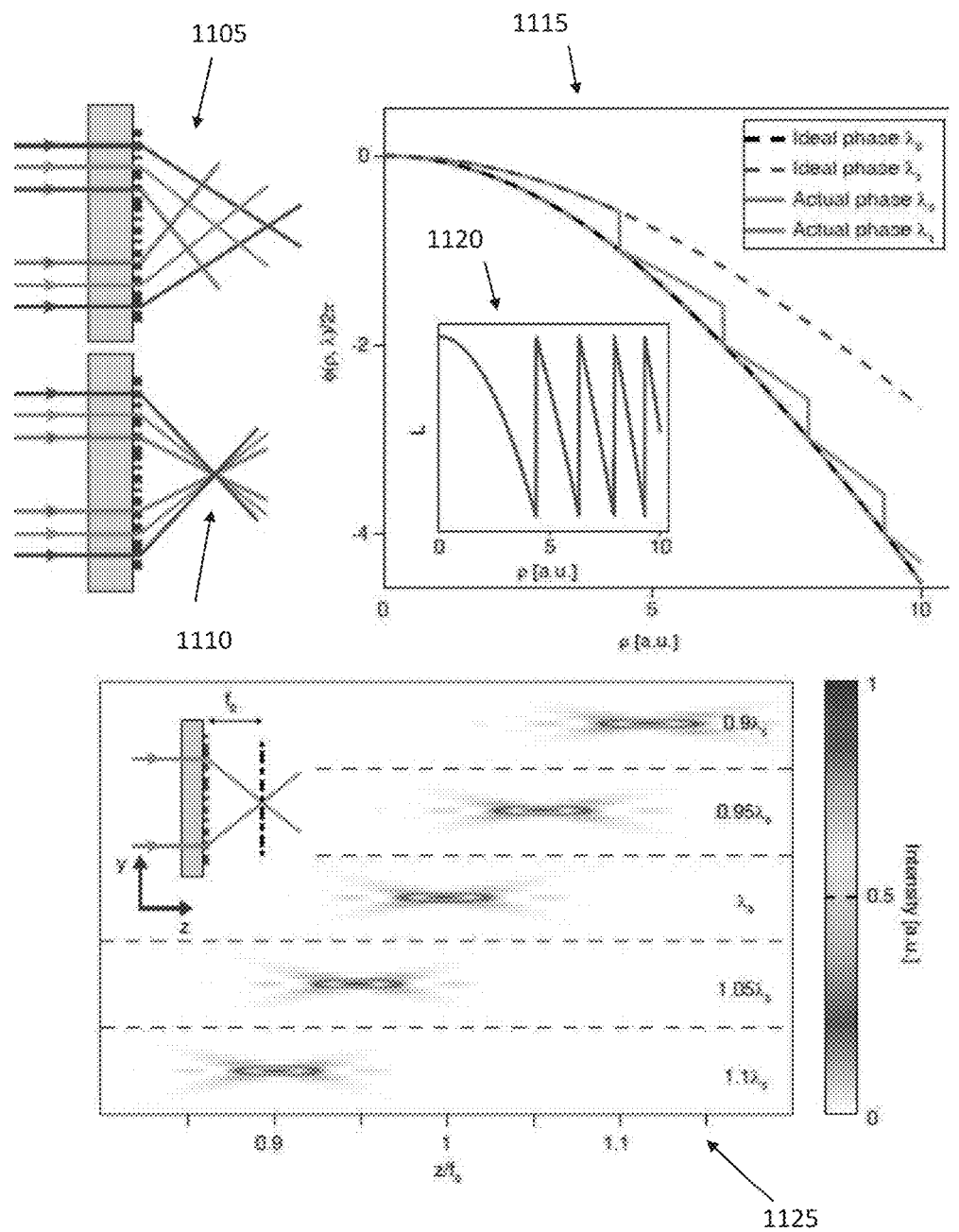
FIG. 11 illustrates corrections to chromatic aberrations.

In diffractive lenses, chromatic dispersion mainly manifests itself through a significant change of focal length as a function of wavelength, see Ref. [18]. This change is schematically shown in FIG. 11 (1105), where different wavelengths focus at different spatial locations. FIG. 11 also illustrates a metasurface lens corrected to have the same focal distance at a few wavelengths (1110). To better understand the underlying reasons for this chromatic dispersion, it is possible to consider a hypothetical aspherical metasurface lens. The lens is composed of different meta-atoms which locally modify the phase of the transmitted light to generate the desired wavefront. It can be assumed that the meta-atoms are dispersionless in the sense that their associated phase changes with wavelength as $\varphi(\lambda)=2\pi L/\lambda$ like a piece of dielectric with a constant refractive index. Here $\lambda$ is the wavelength and L is an effective parameter associated with the meta-atoms that controls the phase (L can be an actual physical parameter or a function of physical parameters of the meta-atoms). It can be assumed that the full $2\pi$ phase needed for the lens is covered using different meta-atoms with different values of L. The lens is designed to focus light at $\lambda_0$ (1115) to a focal distance $f_0$, and its phase profile in all Fresnel zones matches the ideal phase profile at this wavelength.

Because of the specific wavelength dependence of the dispersionless meta-atoms (i.e. proportionality to $1/\lambda$), at a different wavelength ($\lambda_1$) the phase profile of the lens in the first Fresnel zone follows the desired ideal profile needed to maintain the same focal distance (1115). However, outside the first Fresnel zone, the actual phase profile of the lens deviates substantially from the desired phase profile. Due to the jumps at the boundaries between the Fresnel zones, the actual phase of the lens at $\lambda_1$ is closer to the ideal phase profile at $\lambda_0$ than the desired phase profile at $\lambda_1$. In (1120) the effective meta-atom parameter L is plotted as a function of distance to the center of the lens $\rho$. The jumps in L coincide with the jumps in the phase profile at $\lambda_1$. In (1125), the simulated intensity profile of the same hypothetical lens is plotted at a few wavelengths close to $\lambda_0$. The focal distance changes approximately proportional to $1/\lambda$. This wavelength dependence is also observed in Fresnel zone plates, see Ref. [18], and for lenses with wavelength independent phase profiles, see Refs. [11, 12] (the $1/\lambda$ dependence is exact in the paraxial limit, and approximate in general). The behavior illustrated in FIG. 11 confirms the previous observation that the phase profile of the lens at other wavelengths approximately follows the phase profile at the design wavelength. Therefore, the chromatic dispersion of metasurface lenses mainly stems from wrapping the phase, and the dependence of the phase on only one effective parameter (e.g. L) whose value undergoes sudden changes at the zone boundaries. As described in the following, using two parameters to control metasurface phase at two wavelengths can resolve this issue, and enable lenses with the same focal lengths at two different wavelengths.

As described above, several optical metasurfaces designs suffer from high chromatic aberrations because of their principle of operation based on diffraction. For instance, a metasurface lens will focus optical waves with different wavelengths to different focal points. Furthermore, wavelengths other than the wavelength at which the metasurface is designed to operate will a distorted focus. An example of distorted focus can be seen, for example, in FIG. 1 (105). In FIG. 1, several different wavelengths (110) are transmitted through a substrate (115), for example a transparent substrate. Subsequently, the metasurface (125) will scatter the electromagnetic radiation with a distorted focus (120). In other words, each wavelength will focus at a different spatial position. By contrast, the metasurfaces described in the present disclosure can focus multiple wavelengths at the same spatial position (130). A typical metasurface lens focuses lights of different wavelengths to different focal points, while a multi-wavelength metasurface focuses light of specific wavelengths to the same focal point.

Figure 2:
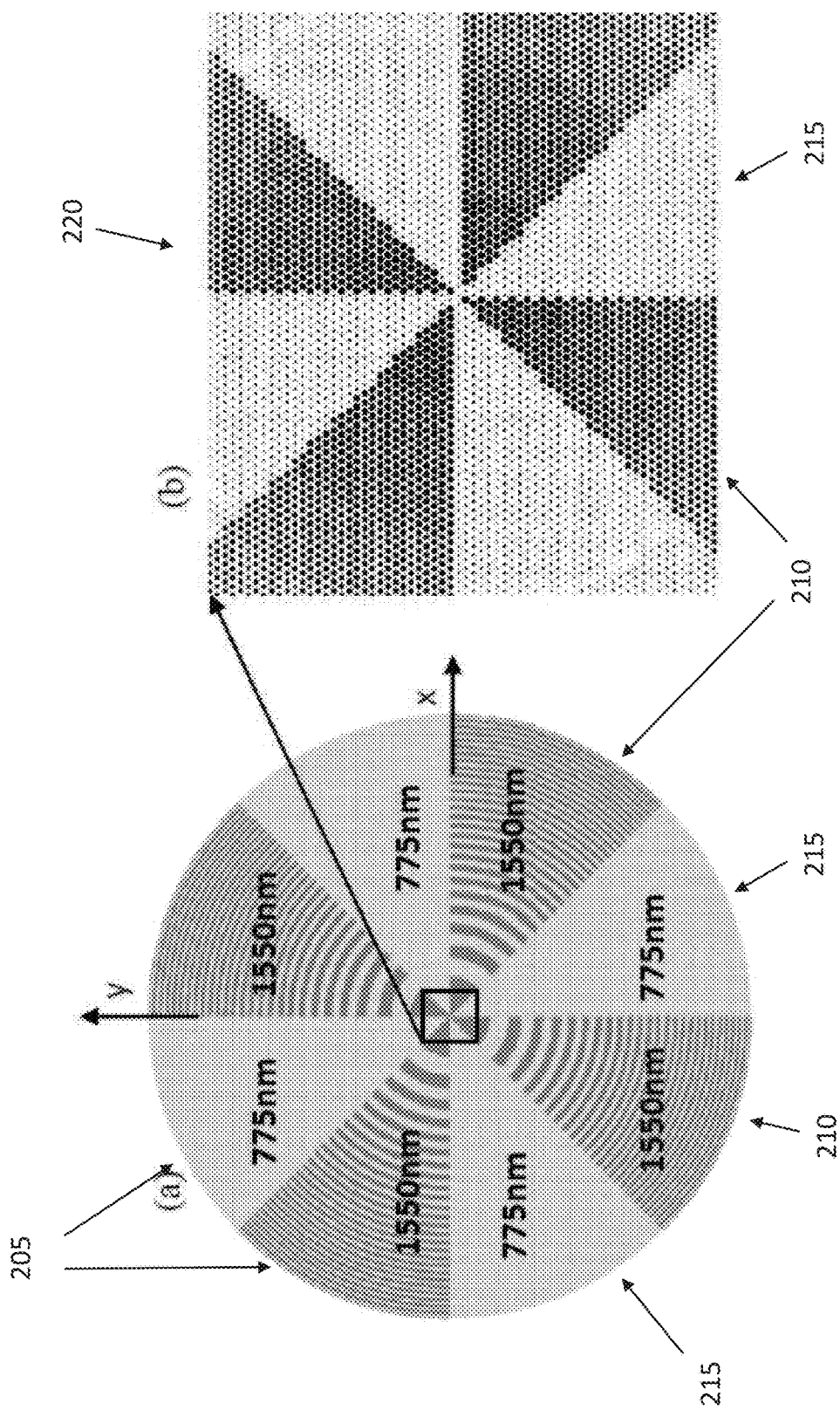
FIG. 2 illustrates a metasurface lens divided into eight sectors.

For wavelengths far enough from the wavelength at which a metasurface is designed to operate, in certain cases there can be no focus, as the scattered light does not add up constructively at any point. This property can be employed to design different parts of a metasurface (i.e. different sub-lattices of the total structure) to operate at wavelengths that are far enough from each other. For example, FIG. 2 illustrates a metasurface lens divided into eight sectors (205). Each of the eight sectors can be designed to focus a specific wavelength. For example, in FIG. 2 four sectors (210) are designed for wavelength of 1550 nm, while the other four sectors (215) are designed for 775 nm. In FIG. 2, a zoomed-in view (220) of the center of the metasurface lens is also visible. The lens in FIG. 2 is designed with cylindrical posts of a-Si, amorphous Si, as scattering elements on a glass substrate. The scattering elements, or posts, are 938 nm tall, and have different diameters to generate different phases. In other embodiments, different geometries and height may be used for the scattering elements.

Various methods can be utilized to designate and assign sub-lattices to different wavelengths, and to increase efficiency or improve other beam shaping characteristics. In some embodiments, the present disclosure describes double-wavelength lenses based on a dielectric metasurface structure described in Ref. [1]. The high index material used in these embodiments can be, for example, a-Si with a thickness of 938 nm, on a fused silica substrate. For example, a lens can have a 100 µm diameter and a 50 µm focal distance. The total lens area can be divided into multiple sectors. FIG. 2 shows a lens designed for 1550 nm and 775 nm with eight sectors (four for each wavelength), while FIG. 3 shows a SEM micrograph of a fabricated device according to this example.

Figure 3:
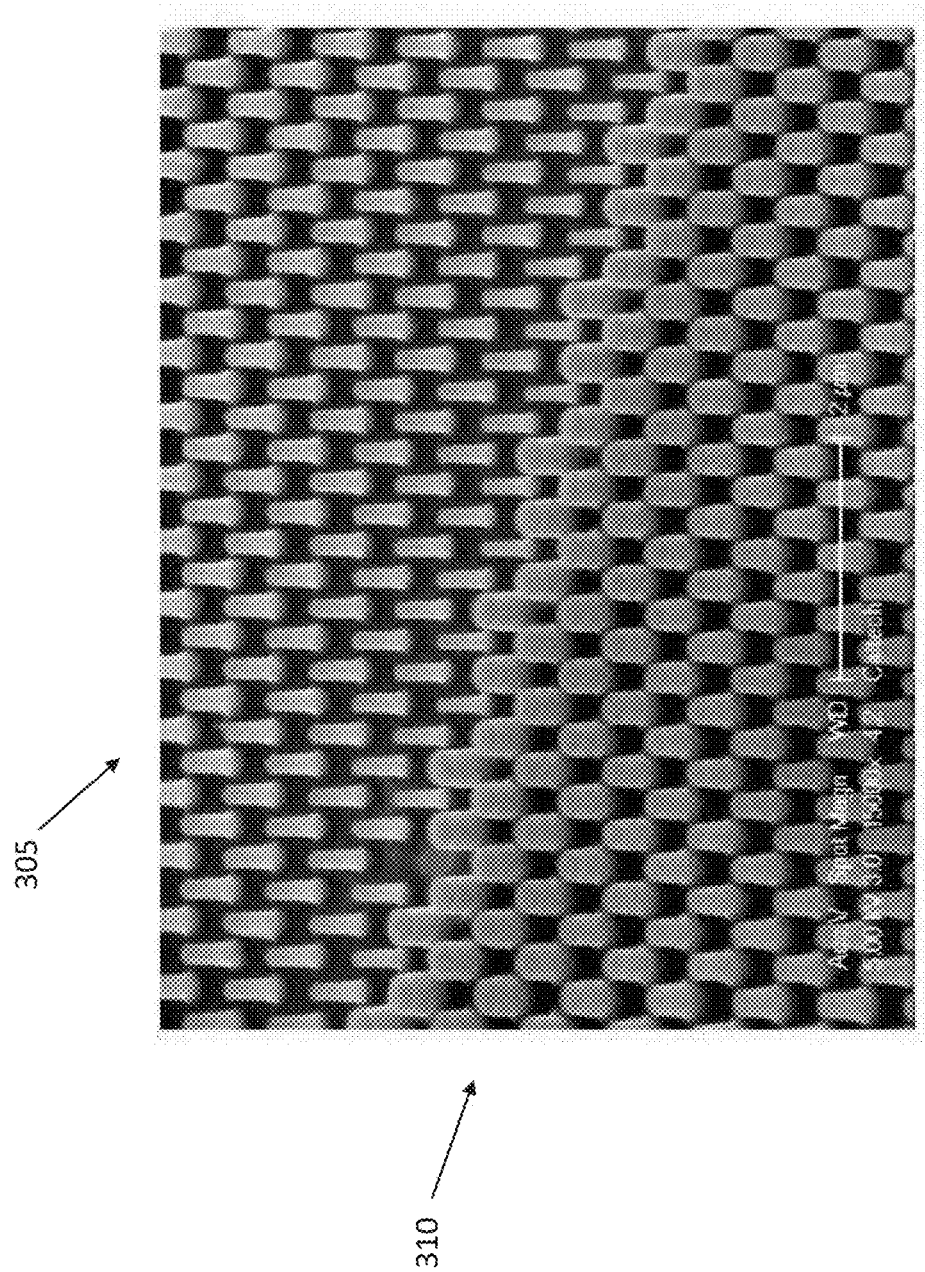
FIG. 3 depicts an SEM micrograph of a fabricated device.

In FIG. 3, cylindrical a-Si scatterers on a fused silica substrate can be seen, having two diameters (305, 310). Each of the diameters scatters light at a specific wavelength, such as 1550 and 775 nm.

Figure 4:
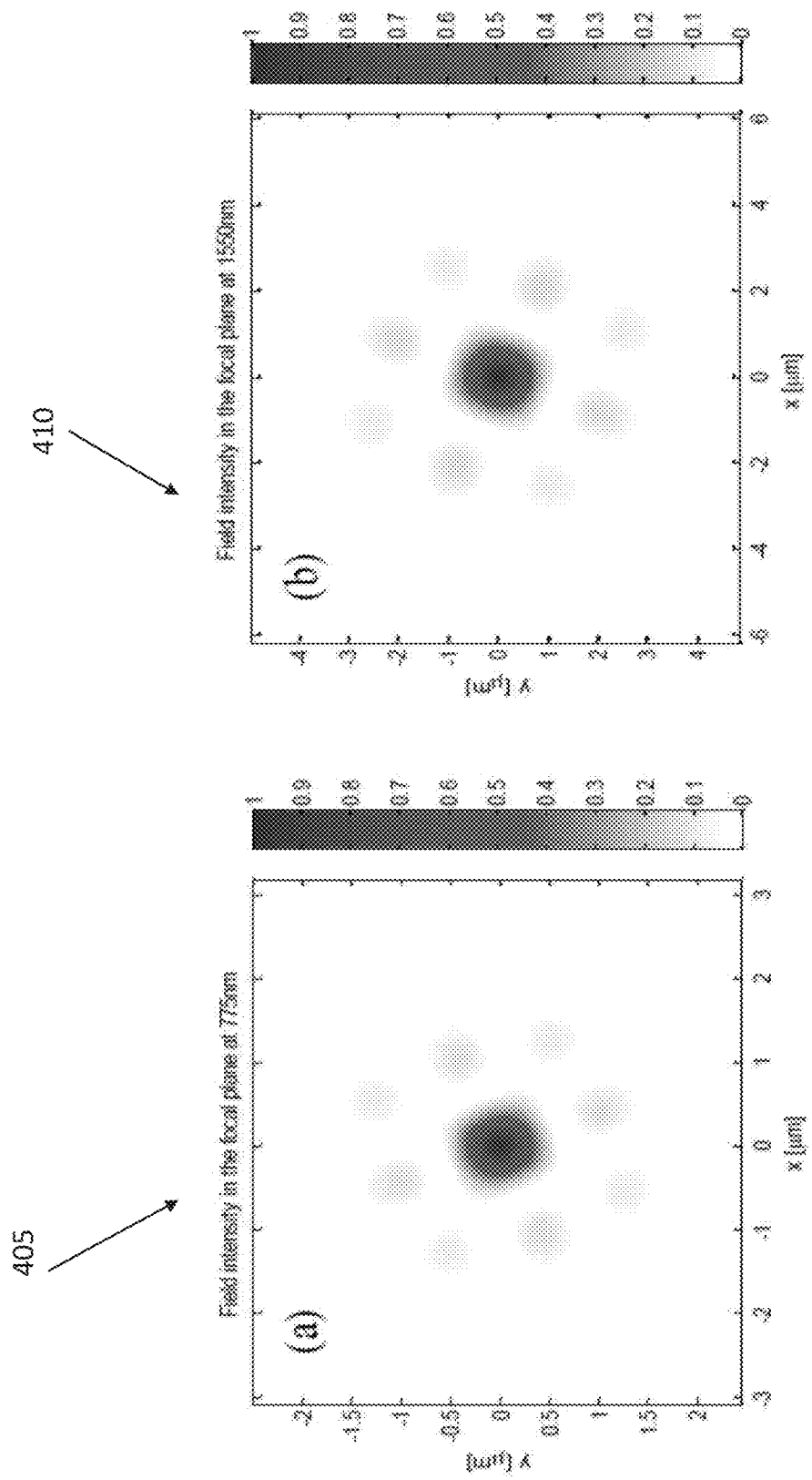
FIGS. 4-6 illustrate simulated intensity patterns.
Figure 5:
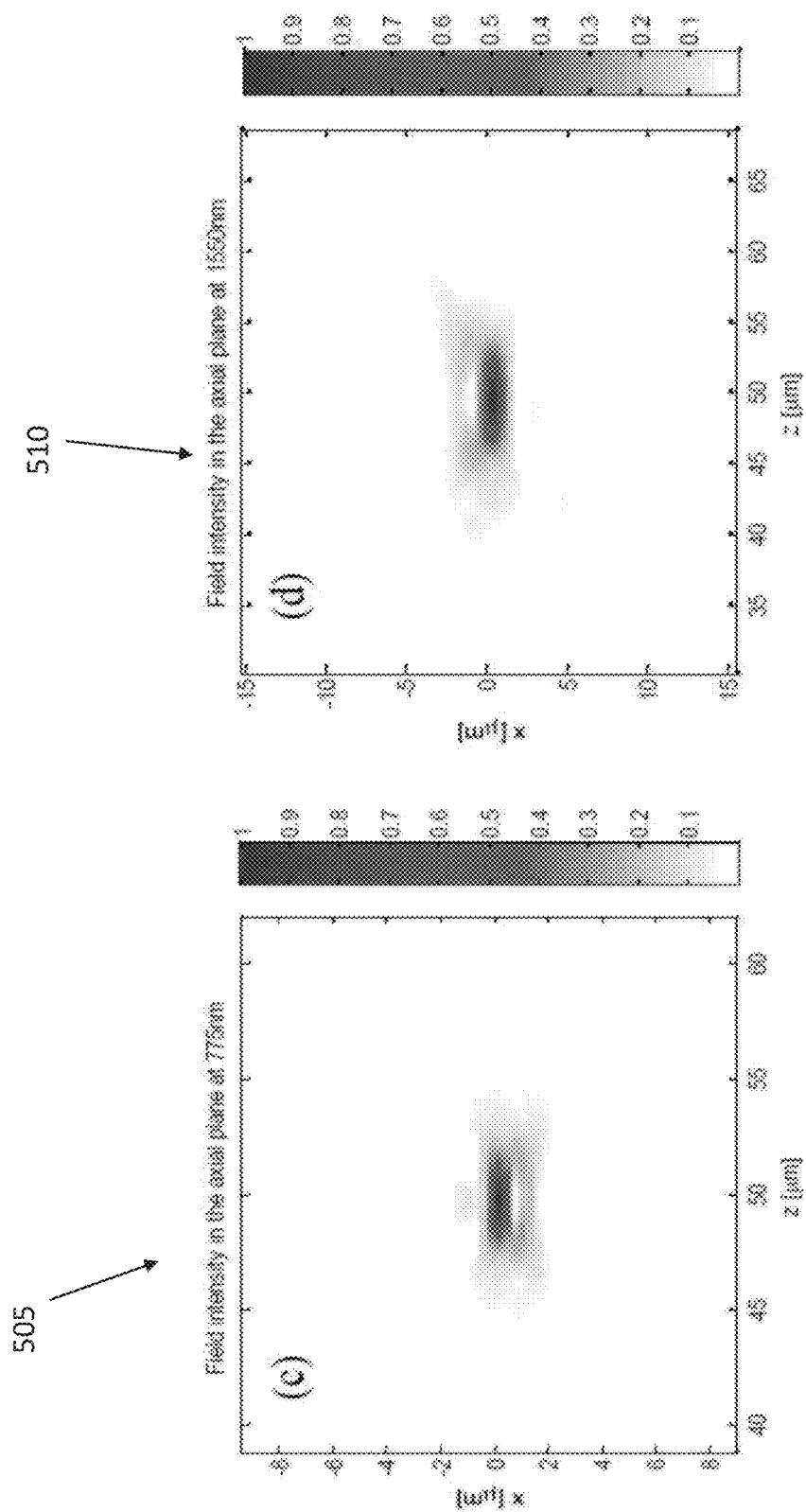
Figure 6:
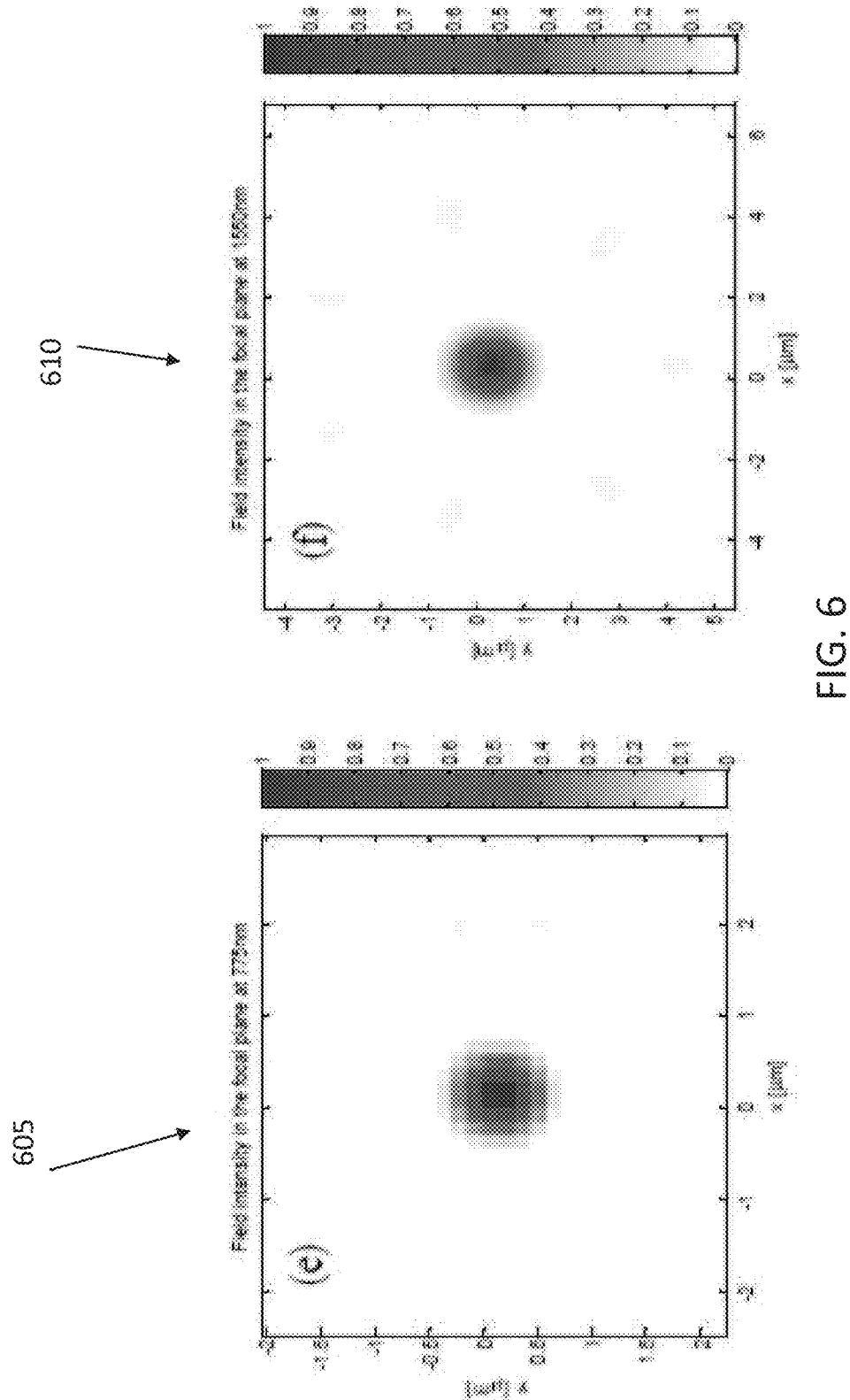

The simulated intensity patterns for the structure of FIG. 3, in the focal and axial planes, are shown in FIGS. 4-6 for both wavelengths. An efficiency higher than 40% is expected at both wavelengths. Efficiency is defined as the ratio of power focused to an area of 5 µm×5 µm around the focal point, to the total power of the beam incident upon the lens. This performance can be understood by the fact that only around 50% of the incident beam power is incident on parts of the metasurface designed for that specific wavelength. Increasing the number of sectors can improve the focus shape by removing the division effects, but can result in a lower efficiency as the edge effects become more important.

FIG. 4 illustrates the simulated intensity in the focal plane for 775 (405) and 1550 (410) nm, for a lens with 8 sectors. FIG. 5 illustrates the simulated intensity in the axial plane for 775 (505) and 1550 (510) nm, for a lens with 8 sectors. FIG. 6 illustrates the simulated intensity in the focal plane for 775 (605) and 1550 (610) nm, for a lens with 14 sectors. The optical intensity is plotted at the focal plane of a double-wavelength lens. The resultant efficiency is reduced to about 35% in this example.

Figure 7:
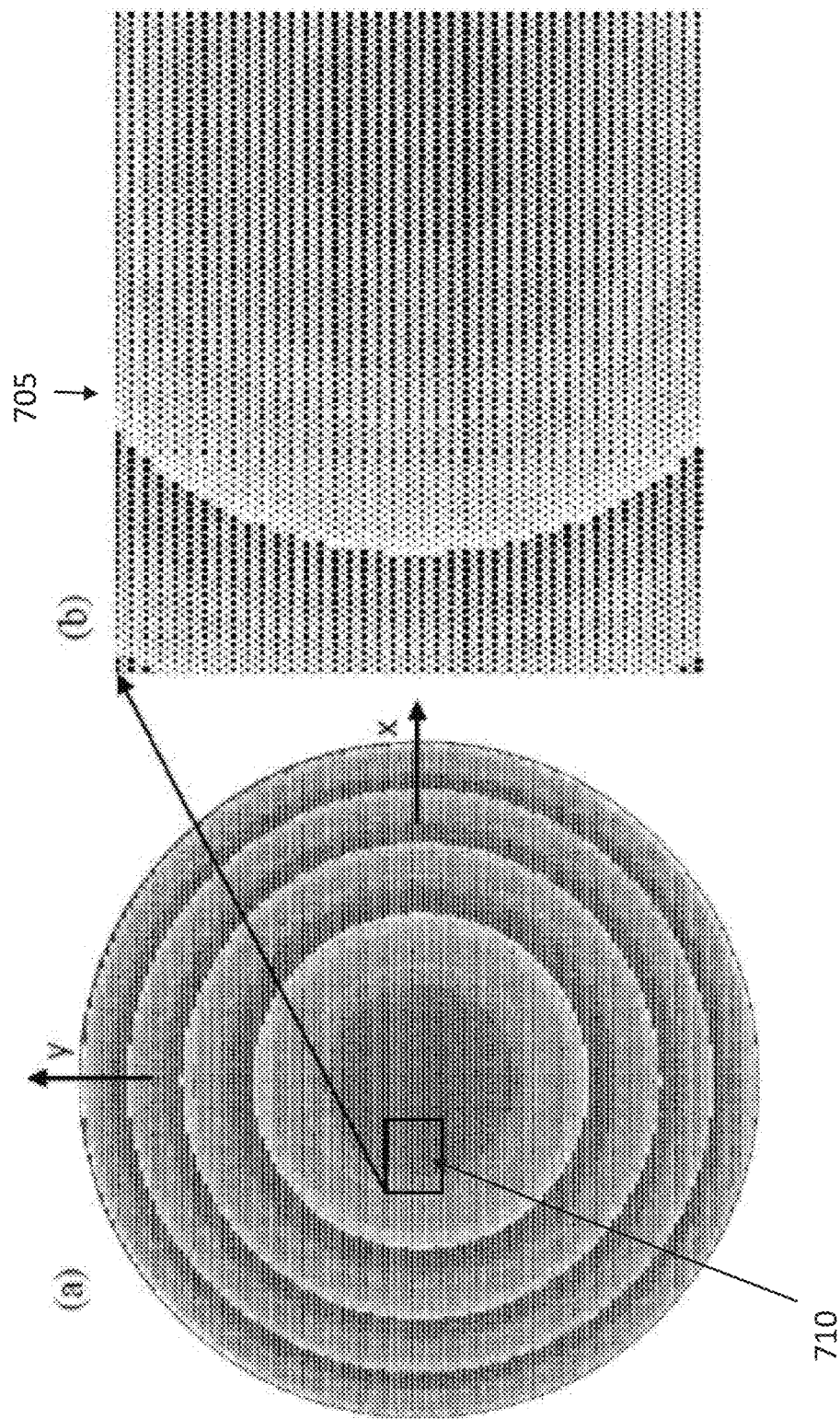
FIG. 7 illustrates a lens with alternating posts.

The design method described above can be used with other sub-lattice selections. For example, a double wavelength lens can be designed by alternatingly assigning the posts in each row of the lattice to one of each of two wavelengths, as visible in FIG. 7. FIG. 7 illustrates a zoomed detail (705) view of the area (710).

In the embodiment of FIG. 7, a double wavelength metasurface is realized by alternating the operating wavelength in each row of the lattice. The zoomed-in view (710) of the metasurface shows the large size difference between posts on each row relative to its adjacent rows. The smaller size rows are designed for the shorter wavelength, while the larger ones are designed for the longer wavelength. In some embodiments, the rows can be circular rows, progressively radiating outward from the center of a circular lens.

Figure 8:
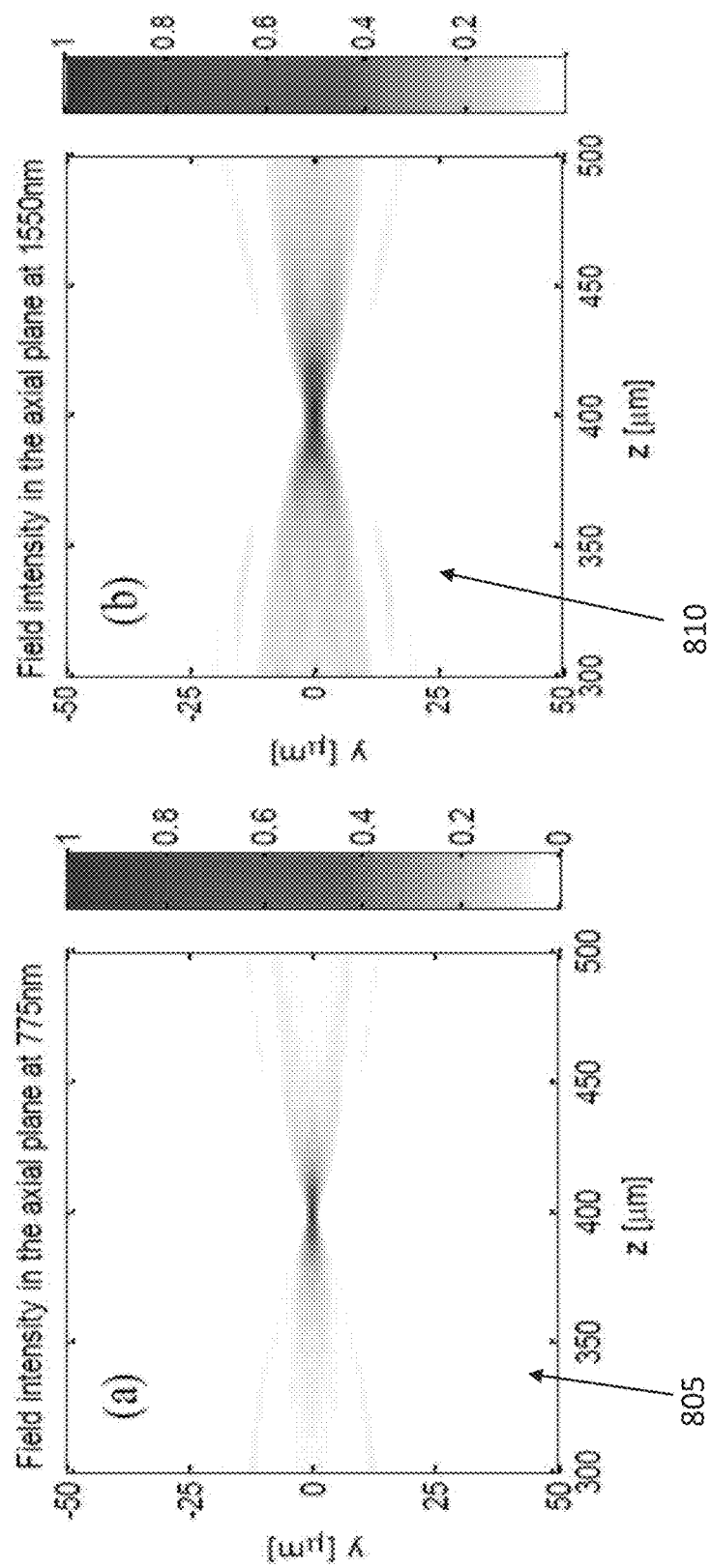
FIG. 8 illustrates the normalized optical intensity plotted in the axial plane of the double-wavelength lens of FIG. 7.
Figure 9:
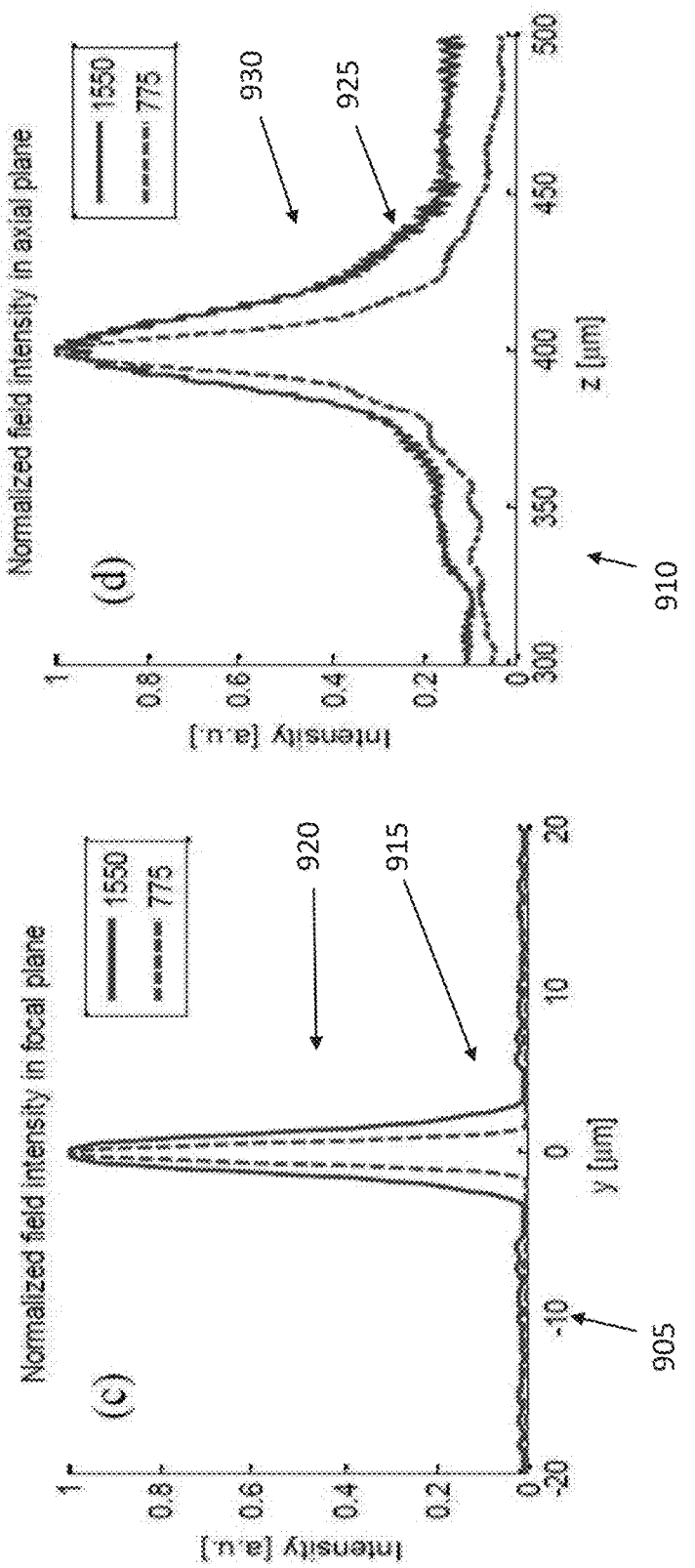
FIG. 9 illustrates the normalized intensity profile in the axial and focal planes.

In some embodiments, a lens can be realized with a diameter of 300 µm and a focal distance of 400 µm, for operation at the 1550 nm and 775 nm wavelengths. Normalized simulated field intensities for this exemplary lens are shown in FIGS. 8-9. An efficiency of about 27% is expected in both wavelengths for this case.

FIG. 8 illustrates the normalized optical intensity plotted in the axial plane of the double-wavelength lens of FIG. 7, for 775 nm (805), and 1550 nm (810). FIG. 9 illustrates the normalized intensity profile in the focal plane (905) around the focal point, showing a good focus pattern for both wavelengths, 775 nm (915) and 1550 nm (920).

FIG. 9 also illustrates the normalized intensity plotted in the axial plane (910), showing an equal focal distance of 400 µm for both wavelengths, 775 nm (925) and 1550 nm (930), as designed.

In other embodiments, the design of multi-wavelength metasurfaces uses extra degrees of freedom in the geometry of the scattering elements to independently control the phase profiles of the metasurfaces at different wavelengths. For example, elliptical high contrast scatterers can be used instead of cylindrical ones. The elliptical elements will have two control parameters (i.e. two ellipse diameters) instead of one (radius of cylindrical posts). Therefore, the elliptical elements have one additional degree of freedom compared to the cylindrical elements. By using the additional degrees of freedom, the phases imparted on two polarizations of light (such as vertical and horizontal) can be controlled almost independently.

Figure 10:
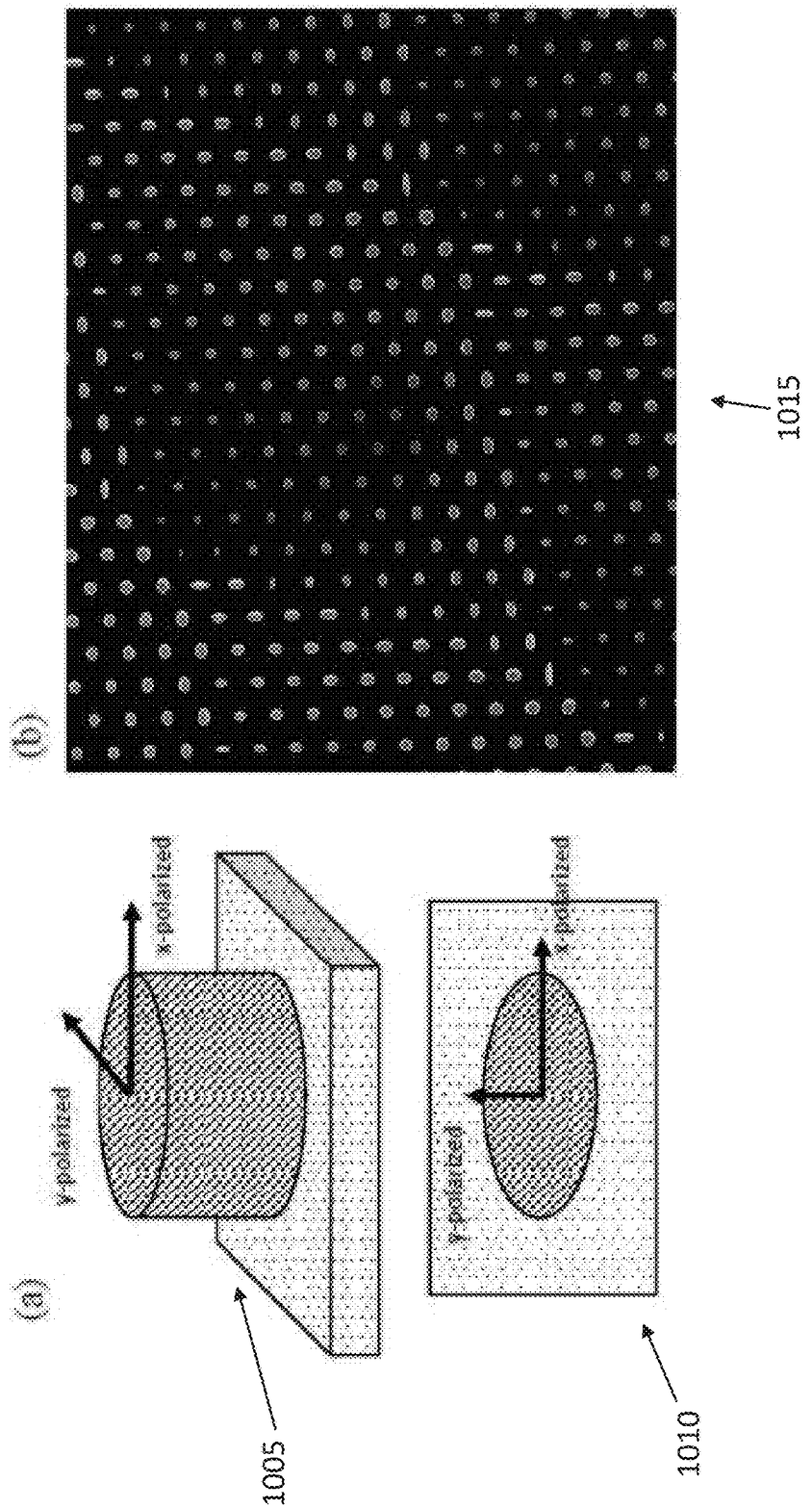
FIG. 10 illustrates an example of elliptical scattering elements.

FIG. 10 illustrates an example of elliptical scattering elements (1005,1010), with a schematic drawing of an elliptical scatterer. The elliptical scattering elements can control the polarization directions of light in two perpendicular axis, x-polarized and y-polarized light, with respect to the ellipsoidal cross section. FIG. 10 comprises a SEM micrograph of fabricated a-Si elliptical scatterers (1015). The orientation of each scatterer, as visible in FIG. 10, can be designed according to the required specification of a lens, to scatter light at different wavelengths.

By using a different polarization for each of the two wavelengths, it is possible to control the phase profiles of the metasurface independently for each wavelength. Thus, it is possible to design a double-wavelength optical device (a lens, for instance) based on the type of structure illustrated in FIG. 10. Such a device can have a higher efficiency (about 80-90%) when operated, as no part of the beam is lost. This method can also be used when the two wavelengths of interest are close to each other.

In addition to designing metasurfaces to have the same functionality at different wavelengths, the methods described above can be used to design a metasurface for distinct desired functionalities at different wavelengths. For instance, a lens that has two different (but desired) focal distances at two different wavelengths, or a lens that is converging at one wavelength, and diverging at another wavelength.

In some embodiments, the scattering elements assigned to each wavelength have different geometric dimensions, and may have different spacing. For example, in FIG. 2 the consecutive circular rows have decreasing thickness radiating outward from the center of the lens. In FIG. 2, the sectors assigned to each type of scattering elements are octaves in a circular lens.

In some embodiments, three or more types of scattering elements may be employed to scatter light at three or more different wavelengths. In some embodiments, the scattering elements have a height between 100 and 1000 nm.

Figure 12:
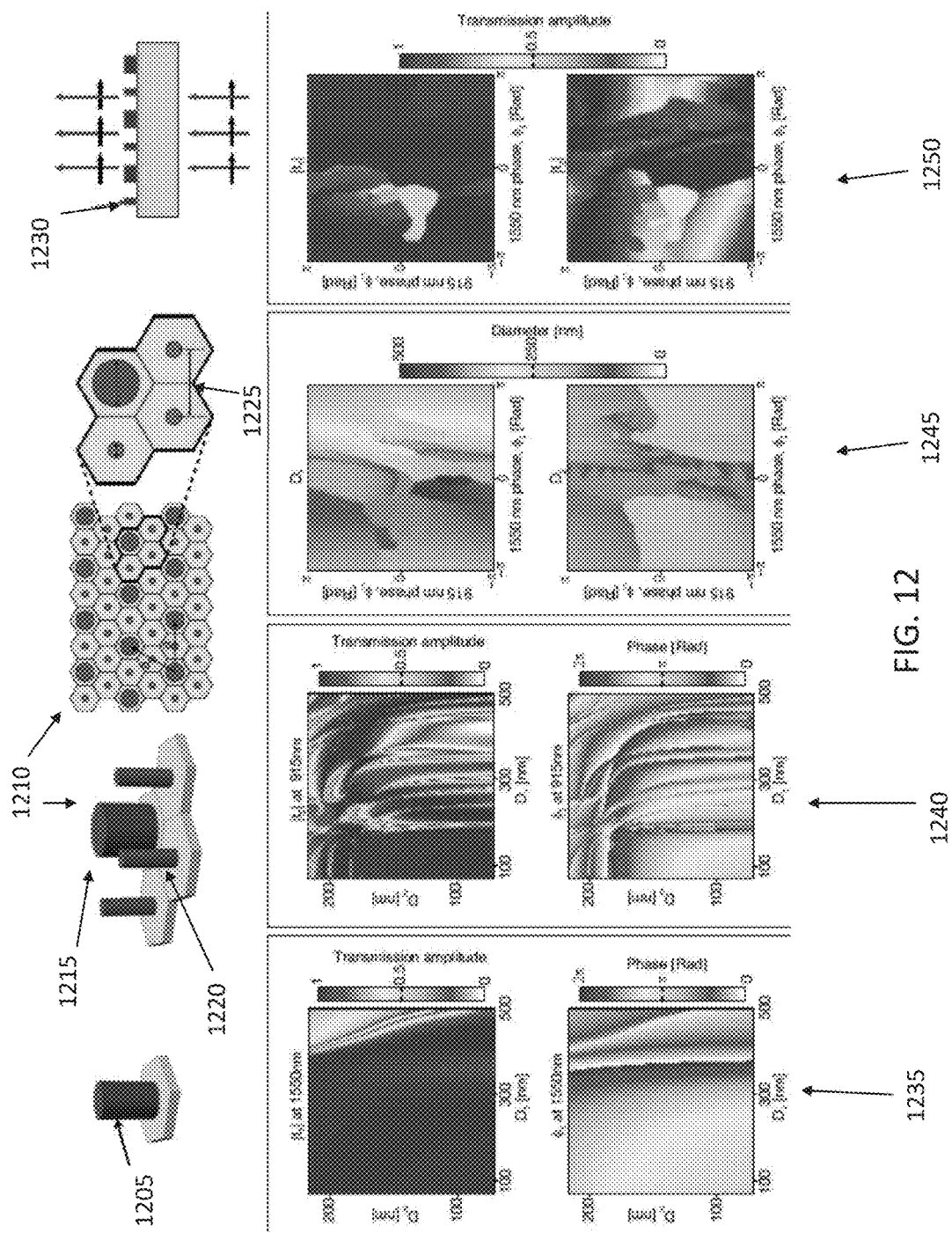
FIG. 12 illustrates an exemplary metasurface design.

In some embodiments, the metasurface platform described in the present disclosure is based on amorphous silicon (a-Si) nano-posts on a fused silica substrate, see FIG. 12 (1205). The nano-posts can be placed on the vertices of a hexagonal lattice, or equally in the centers of the hexagons (1210), and locally sample the phase to generate the desired phase profile, see Ref. [8]. For a fixed height, the transmission phase of a nano-post can be controlled by varying its diameter. The height of the posts can be chosen such that at a certain wavelength the whole $2\pi$ phase shift is covered, while keeping the transmission amplitude high. To design a metasurface that operates at two different wavelengths, a unit cell consisting of four different nano-posts (1210) can be chosen because it has more parameters to control the phases at two wavelengths almost independently. For example, one type of post (1215) may have a larger diameter than other posts (1220).

As molecules consisting of multiple atoms form the units of more complex materials, these unit cells with multiple meta-atoms can be termed meta-molecules. The meta-molecules can also form a periodic lattice (in this example hexagonal), and effectively sample the desired phase profiles simultaneously at two wavelengths. The lattice is subwavelength at both wavelengths of interest; therefore, the non-zero diffraction orders are not excited. In general, the four nano-posts of the exemplary meta-molecule of FIG. 12 can each have different diameters and distances from each other. However, to make the design process more tractable, in some embodiments three of the four nano-posts have the same diameter $D_1$ and the fourth post has a diameter $D_2$. The posts can be placed in the centers of the hexagons at a distance a/2 (1225). Therefore, each meta-molecule can have two parameters, $D_1$ and $D_2$, to control the phases at two wavelengths. For example, the two wavelengths can be 1550 nm and 915 nm, because of the availability of lasers at these wavelengths. A periodic array of meta-molecules was simulated to find the transmission amplitude and phase as shown in (1230). The simulated transmission amplitude and phase for 1550 nm ($|t_1|$ and $\varphi_1$) and 915 nm ($|t_2|$ and $\varphi_2$) are plotted as functions of $D_1$ and $D_2$ in (1235) and (1240). In these simulations the lattice constant (a) was set to 720 nm and the posts were 718 nm tall. Since the two wavelengths are not close, the ranges of $D_1$ and $D_2$ must be very different in order to properly control the phases at 1550 nm and 915 nm. For each desired combination of the phases $\varphi_1$ and $\varphi_2$ in the $(-\pi, \pi)$ range at the two wavelengths, there is a corresponding $D_1$ and $D_2$ pair that minimizes the total transmission error which is defined as $E=|\exp(i\varphi_1)-t_1|^2+|\exp(i\varphi_2)-t_2|^2$. These pairs are plotted in (1245) as a function of $\varphi_1$ and $\varphi_2$. Using the complex transmission coefficients (i.e. $t_1$ and $t_2$) in error calculations results in automatically avoiding resonance areas where the phase might be close to the desired value, but transmission is low. The corresponding transmission amplitudes for the chosen meta-molecules are plotted in (1250), and show this automatic avoidance of low transmission meta-molecules. In the lens design process, the desired transmission phases of the lens are sampled at the lattice points at both wavelengths resulting in a $(\varphi_1, \varphi_2)$ pair at each lattice site. Using the plots in (1245), values of the two post diameters can be found for each lattice point. Geometrically, the values of the two diameters are limited by $D_1+D_2<a$. In this example, a minimum value of 50 nm can be set for the gaps between the posts to facilitate the metasurface fabrication.

Figure 13:
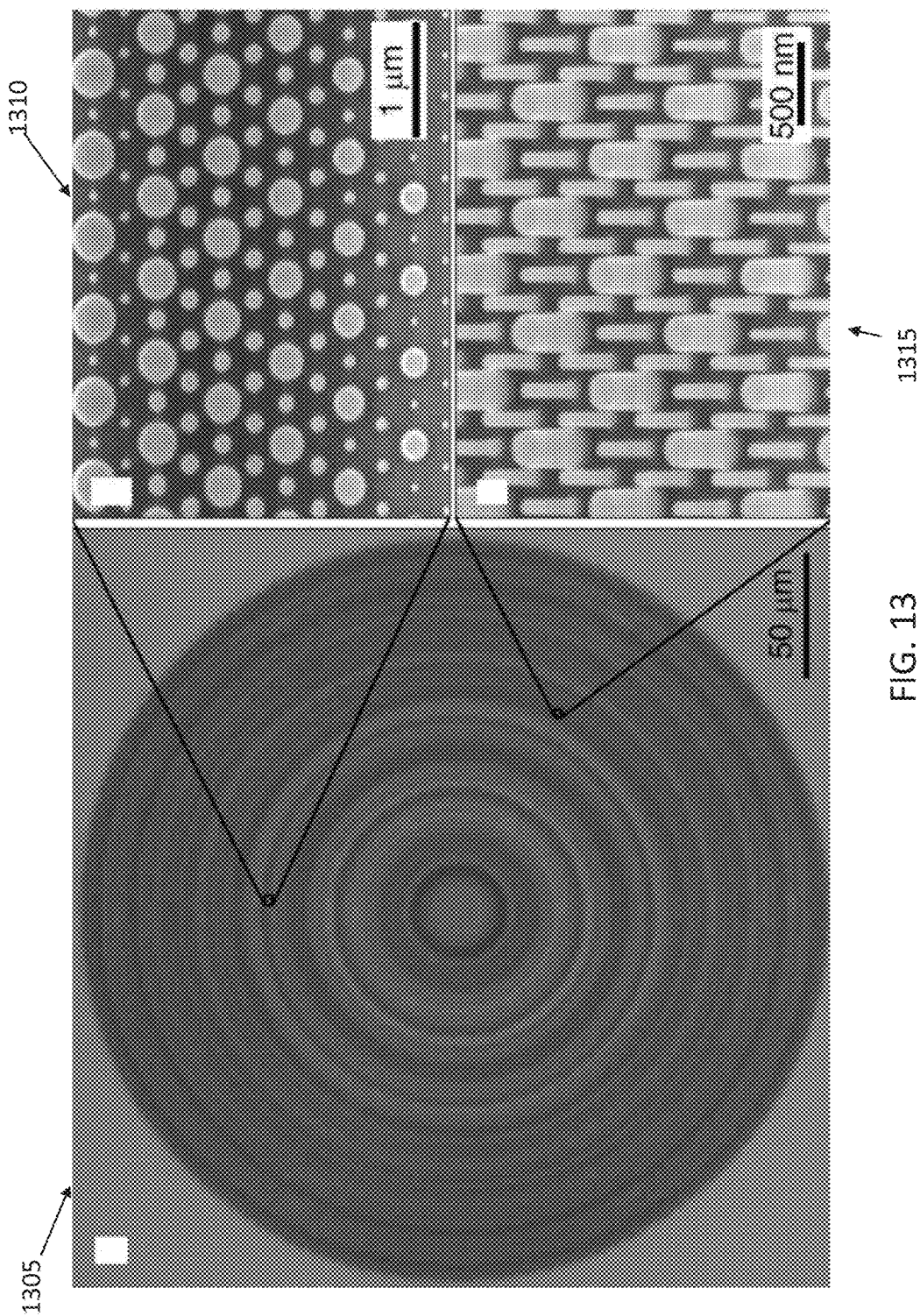
FIG. 13 illustrates microscope images of exemplary structures.

A double wavelength aspherical lens can be designed using the exemplary platform described above, to operate at both 1550 nm and 915 nm. The lens has a diameter of 300 μm and focuses the light emitted from single mode fibers at each wavelength to a focal plane 400 μm away from the lens surface (the corresponding paraxial focal distance is 286 μm, thus the numerical aperture is 0.46). The exemplary lens was fabricated using standard nanofabrication techniques: a 718-nm-thick layer of a-Si was deposited on a fused silica substrate, the lens pattern was generated using electron beam lithography and transferred to the a-Si layer using aluminum oxide as a hard mask. Optical (1305) and scanning electron microscope (1310, 1315) images of the lens and nano-posts are shown in FIG. 13. For characterization, the fabricated metasurface lens was illuminated by light emitted from the end facet of a single mode fiber, and the transmitted light intensity was imaged at different distances from the lens using a custom built microscope.

Figure 14:
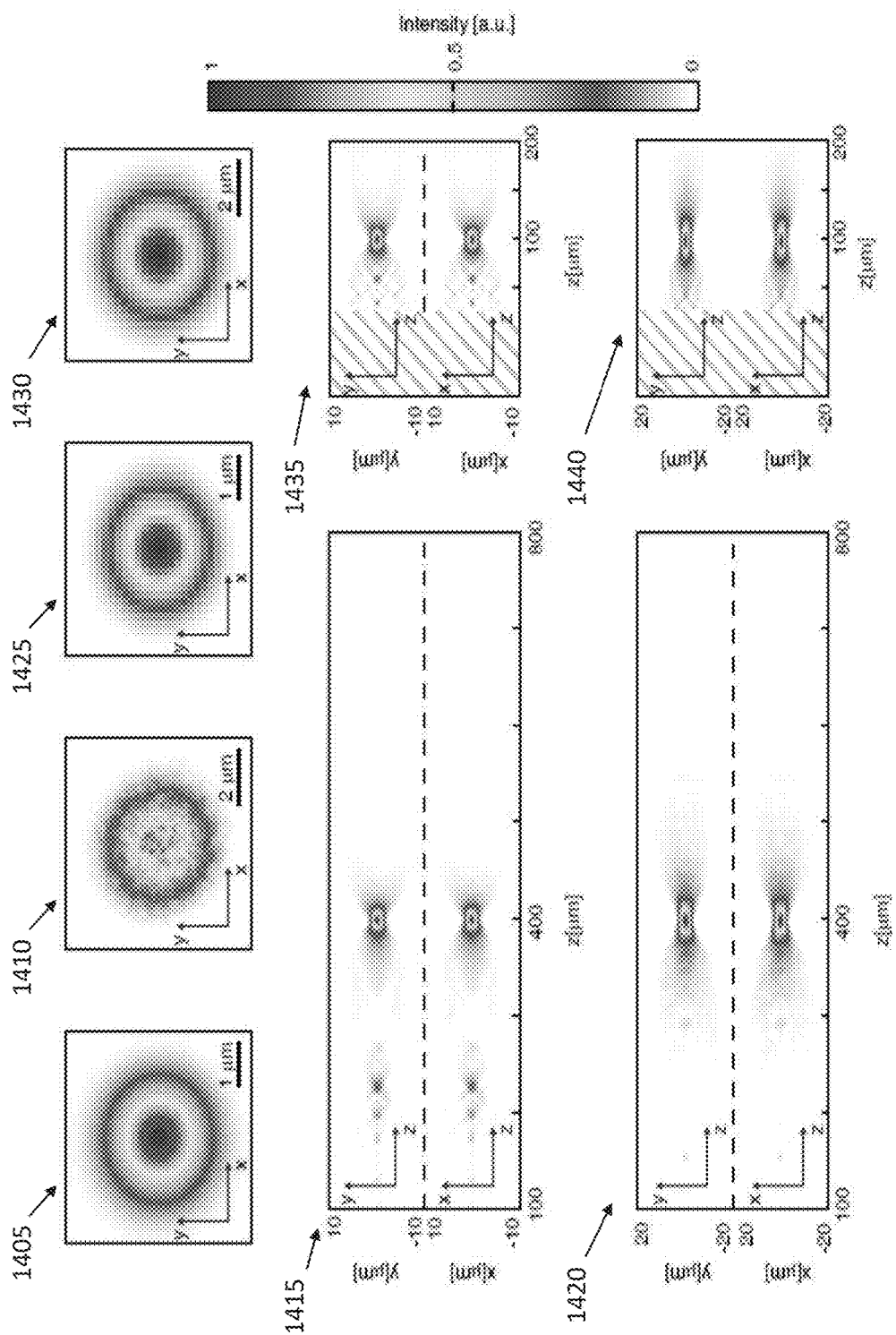
FIG. 14 illustrates exemplary measurement results.

Measurement results for both wavelengths are plotted in FIG. 14. In FIG. 14, (1405) and (1410) show the intensity profiles in the focal plane measured at 915 nm and 1550 nm, respectively. The measured full width at half maximum (FWHM) is 1.9 μm at 915 nm, and 2.9 μm at 1550 nm. The intensity measured at the two axial plane cross sections is plotted in (1415) and 1420) for the two wavelengths. A nearly diffraction limited focus is observed in the measurements, and no other secondary focal points with comparable intensity is seen.

To confirm the diffraction limited behavior, a perfect phase mask was simulated using the same illumination as the measurements. The simulated FWHM's were 1.6 μm and 2.75 μm for 915 nm and 1550 nm respectively. Focusing efficiencies of 22% and 65% were measured for 915 nm and 1550 nm, respectively. Focusing efficiency is defined as the ratio of the power passing through a 20-μm-diameter disk around the focus to the total power incident on the lens. Another lens with a longer focal distance of 1000 μm (thus a lower NA of 0.29) was fabricated and measured with the same platform and method. Measurement results for those devices show slightly higher focusing efficiencies of 25% and 72%, measured at 915 nm and 1550. For comparison, a lens designed with the same method and based on the same metasurface platform is simulated using finite difference time domain (FDTD) method with a freely available software (MEEP), see Ref. [27]. To reduce the computational cost, the simulated lens is four times smaller and focuses the light at 100 μm distance. Because of the equal numerical apertures of the simulated and fabricated devices, the focal intensity distributions and the focal depths are comparable. The simulation results are shown in (1425,1430,1425,1440).

In FIG. 14, (1425) and (1430) show the simulated focal plane intensity of the lens at 915 nm and 1550 nm, respectively. The simulated FWHM is 1.9 μm at 915 nm and 3 μm at 1550 nm, both of which are in accordance with their corresponding measured values. Also, the simulated intensity distributions in the axial cross section planes, which are shown in (1435) and (1440), demonstrate only one strong focal point. The focusing efficiency was found to be 32% at 915 nm, and 73% at 1550 nm. The difference in the simulated and measured efficiencies can be attributed to fabrication imperfections and measurement artifacts.

The efficiency at 915 nm is found to be lower than what expected both in measurement and FDTD simulation. While the average power transmission of the selected meta-molecules is about 73% as calculated from (1435), the simulated focusing efficiency is about 32%. To better understand the reasons for this difference, two blazed gratings with different angles were designed and simulated for both wavelengths using the same meta-molecules. It is observed that for the gratings (that are aperiodic), a significant portion of the power is diffracted to other angles both in reflection and transmission. Additionally, the power lost into diffractions to other angles is higher for the grating with larger deflection angle. The main reason for the large power loss to other angles is the relatively large lattice constant. The chosen lattice constant of a=720 nm is just slightly smaller than 727 nm, the lattice constant at which the first-order diffracted light starts to propagate in the glass substrate for a perfectly periodic structure. Thus, even a small deviation from perfect periodicity can result in light diffracted to propagating orders.

Additionally, the lower transmission of some meta-molecules reduces the purity of the plane wave wavefronts diffracted to the design angle. Furthermore, the desired phase profile of high numerical aperture lenses cannot be sampled at high enough resolution using large lattice constants. Therefore, as shown in this work, a lens with a lower numerical aperture has a higher efficiency. There are a few methods to increase the efficiency of the lenses at 915 nm: The lattice constant is bound by the geometrical and fabrication constraint: $D_1+D_2+50$ nm<a, hence the smallest value of $D_1+D_2$ that gives full phase coverage at the longer wavelength sets the lower bound for the lattice constant. This limit can usually be decreased by using taller posts, however, that would result in a high sensitivity to fabrication errors at the shorter wavelength. Thus, a compromise can be made here, and higher efficiency designs might be possible by more optimal selections of the posts height and the lattice constant. The lattice constant can also be smaller if less than the full $2\pi$ phase shift is used at 1550 nm (thus lowering efficiency at 1550 nm). In addition, as explained earlier, in minimizing the total transmission error, equal weights are used for 915 nm and 1550 nm. A higher weight for 915 nm might result in higher efficiency at this wavelength, probably at the expense of 1550 nm efficiency. For instance, if the lens is optimized only for operation at 915 nm, devices with efficiencies as high as 80% are possible, see Ref. [8].

The exemplary approach presented above cannot be directly used to correct for chromatic dispersion over a continuous bandwidth; the multi-wavelength lenses still have chromatic dispersion similarly to normal metasurface lenses in narrow bandwidths around the corrected wavelengths. For achieving zero chromatic dispersion over a narrow bandwidth, the meta-atoms should independently control the phase at two very close wavelengths. High quality factor resonances must be present for the meta-atom phase to change rapidly over a narrow bandwidth, and such resonances will result in high sensitivities to fabrication errors that would make the metasurface impractical.

The meta-molecule platform, described in the present disclosure to correct for chromatic aberration at specific wavelengths, can also be used for applications where different functionalities at different wave-lengths are desired. For instance, it can be used to implement a lens with two given focal distances at two wavelengths, or a lens converging at one wavelength and diverging at another wavelength. Multi-wavelength operation is necessary in various microscopy applications where fluorescence is excited at one wavelength and collected at another. In the example above, only two of the degrees of freedom of the meta-molecules were used, but increased functionalities at more than two wavelengths can be achieved by making use of all the degrees of freedom. Operation at more than two wavelengths enables applications in color display technologies or more complex fluorescence imaging techniques.

As discussed above, simulations were carried out to analyze the metasurfaces described in the present disclosure. In the following, exemplary simulations and experiments are described. The dimensions quoted in the following are intended as exemplary and not limiting the present disclosure to any specific embodiment.

To find the transmission amplitude and phase of a multi-element metasurface, the rigorous coupled wave analysis technique was used, see Ref. [28]. A normally incident plane wave at each wavelength was used as the excitation, and the amplitude and phase of the transmitted wave were extracted. Since the lattice is subwavelength for normal incidence at both wavelengths, only the zeroth order diffracted light is nonzero. Therefore, the use of only one transmission value at each wavelength to describe the behavior of meta-atoms is justified. The lattice constant was chosen as 720 nm, and the a-Si posts were 718-nm tall. Refractive indices of 3.56 and 3.43 were assumed for a-Si at 915 nm and 1550 nm, respectively.

The paraxial focal distance of the two lenses were calculated to be 286 µm and 495 µm for the lenses that focus light from the fiber to 400 µm and 1000 µm respectively, by fitting a parabola to the phase profiles of the lenses. For a fitted parabola $y=\alpha x^2$, the paraxial focal distance can be calculated using $f=2\pi/2\alpha\lambda$. The corresponding numerical apertures can then found to be 0.46 and 0.29 for the two lenses.

The perfect phase mask (that also served as the goal phase profile for the designed devices) was calculated from the illuminating field and the aspherical desired phase profile using the method described Ref. [8]. The illuminating field was calculated by propagating the output fields of single mode fibers at each wavelength using plane wave expansion (PWE) method up to the metasurface layer. The perfect phase mask was then applied to the field, and the result was propagated using the PWE method to the focal point. The diffraction limited FWHM was then calculated from the intensity profile at the focal plane.

Full wave simulation of a full lens was done using finite difference time domain method (FDTD) in MEEP, see Ref. [27]. A lens with a diameter of 75 µm and a focal length of 100 µm was designed with the same method as the fabricated device. The lens focuses the light emitted from a single mode fiber (with mode diameters of 10.4 µm at 1550 nm and 6 µm at 915 nm) placed 150 µm away from a 125 µm thick fused silica substrate (all of the geometrical dimensions were chosen 4 times smaller than the values for the experimentally measured device). The distances to fibers were chosen such that more than 99% of the total power emitted by the fiber passes through the lens aperture. At both wavelengths, the light from the fibers was propagated through air, air-glass interface, and through glass up to a plane about a wavelength before the metasurface using a plane wave expansion (PWE) code.

Electric and magnetic field distributions at this plane were used as sources for FDTD simulation of the lenses, and fields were calculated at about a wavelength after the metasurface using MEEP. The PWE code was used again to further propagate these fields to the focal plane and beyond.

The focusing efficiencies were calculated by dividing the power in a 20-μm-diameter disk around the focus, to the total power incident on the lens.

The following describes the fabrication of an exemplary metasurface. A 718-nm-thick hydrogenated a-Si layer was deposited on a fused silica substrate using the plasma enhanced chemical vapor deposition (PECVD) technique with a 5% mixture of silane in argon at 200° C. A Vistec EBPG5000+™ electron beam lithography system was used to define the metasurface pattern in the ZEP-520A™ positive resist (about 300 nm, spin coated at 5000 rpm for 1 min). The pattern was developed in a resist developer for 3 minutes (ZED-N50™ from Zeon Chemicals™). An approximately 100-nm-thick aluminum oxide layer was deposited on the sample using electron beam evaporation, and was lifted off reversing the pattern. The patterned aluminum oxide hard mask was then used to dry etch the a-Si layer in a 3:1 mixture of $SF_6$ and $C_4F_8$ plasma.

After etching, the mask was removed using a 1:1 solution of ammonium hydroxide and hydrogen peroxide at 80° C. Devices were measured using a fiber placed about 1100 μm away from the metasurface (500 μm substrate thickness plus 600 μm distance between the fiber and the substrate), and a custom built microscope with about 100× magnification. At 915 nm, a fiber coupled semiconductor laser with a single mode fiber with an angled polished connector was used for illumination. Fiber tip angle was adjusted to correct for the angled connector cut. A 100× objective lens (Olympus UMPlanFl™, NA=0.95) and a tube lens (Thorlabs AC254-200-B-ML™) with a focal distance of 20 cm were used to image intensity at planes of interest to a CCD camera (CoolSNAP K4™, Photometrics™). A calibration sample with known feature sizes was measured to find the pixel-size transferred to the object plane. The objective was moved with a translation stage to image different planes around the focus. The plotted axial plane intensities are upsampled 2:1 in the axial direction (4 μm adjacent measurement planes distance to 2 μm) to achieve a smoother graph. For focusing efficiency measurement at 915 nm, a 20-μm-diameter pinhole was placed in the focal plane of the metasurface lens to only let the focused light pass through. The pinhole was made by wet etching a 20 μm hole in a thick layer of chrome deposited on a fused silica substrate. A power meter (Thorlabs PM100D™ with photodetector head Thorlabs S122C™) was then used to measure the power after the pinhole, and the output power of the fiber. The efficiency was calculated as the ratio of these two powers. The reported measured efficiency is therefore a lower bound on the actual efficiency as it does not include reflection from the substrate, and two reflections from the two sides of the pinhole glass substrate. A similar setup was used for measurements at 1550: a tunable 1550 nm laser (Photonetics Tunics-Plus™) was used with a single mode fiber for illumination. The same 100× objective was used with a 20 cm tube lens (Thorlabs AC254-200-C-ML™) to image the intensity in the object plane to a camera (Digital CamIR 1550™ by Applied Scintillation Technologies™). The camera has a significantly non-uniform sensitivity for different pixels which leads to high noise level of the images captured by the camera. The nonphysical high frequency noise of the images (noise with frequencies higher than twice the free space propagation constant) was removed numerically to reduce the noise in the axial intensity patterns. The intensity pattern was also upsampled in the axial direction from the actual 4 μm distance between adjacent measurement planes, to 2 μm to achieve a smoother intensity profile. To find the focused power, the focal plane of the lens was imaged using the microscope to a photodetector. A 2 mm iris in the image plane (corresponding to 20 μm in the object plane) was used to limit the light reaching the photodetector. The input power was measured by imaging the fiber facet to the photodetector using the same setup and without the iris. The efficiency was obtained by dividing the focused power by the input power.

Figure 16:
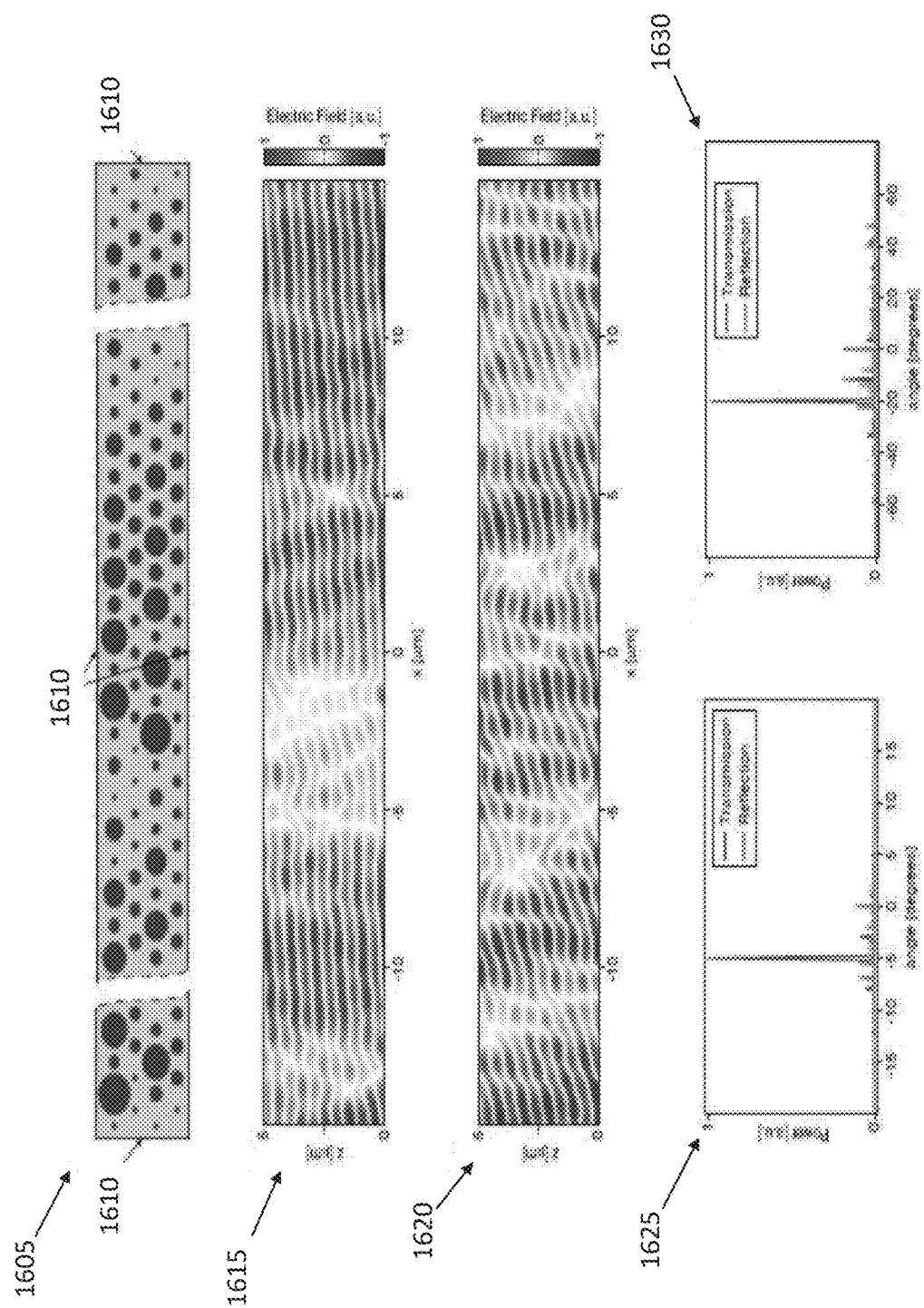
FIG. 16 illustrates exemplary simulation results.

To understand the reasons behind the low efficiency of the lenses at 915 nm, two double wavelength blazed gratings were designed using the proposed meta-molecule scheme. One grating with a small deflection angle (5 degrees) and another one with a larger angle (20 degrees) were simulated at 915 nm using MEEP, and power loss channels were analyzed in both cases (FIG. 16). Both gratings were chosen to be 2 meta-molecules wide in the y direction, so that periodic boundary conditions in this direction can be used in FDTD. The 5 degree grating is 322 lattice constants long in x direction, while the 20 degree one is 146 lattice constants. The lengths are chosen such that the grating phases at 915 nm and 1550 nm are both almost repeated after the chosen lengths (1605). Periodic boundary conditions were set at the edges (1610). An x-polarized plane-wave normally incident from the fused silica side was used as excitation in both simulations, and the transmitted and reflected electric and magnetic field intensities were calculated about a wavelength apart from the meta-molecules. The transmitted fields were further propagated using a plane wave expansion program, and the resulting fields in an area of length 30 μm around the center can be seen in (1615) and (1620) for 5 degree and 20 degree gratings, respectively. The field distributions outside of the areas shown here look similar to the ones shown in FIG. 16. In both cases, a dominant plane wave propagating in the design direction is observed, along with some distortions. Angular distribution of power in transmission and reflection is analyzed using the Fourier transform of the fields. The resulting power distributions are shown in (1625) and (1630) for 5 degrees and 20 degrees, respectively. While the average power transmission of meta-molecules used in both gratings, found from the data in FIG. 12 (1250), is slightly above 73%, only 36% and 22% of the incident power is directed to 5 and 20 degrees for the corresponding gratings. The actual total transmitted powers are 56% and 50% for the 5 and 20 degree gratings, showing that an additional 20% of the power gets reflected as a result of the introduced aperiodicity.

Because of the relatively large lattice constant, even a small aperiodicity can result in generation of propagating modes in the substrate, thus the reflection is considerably higher for the gratings than for a perfectly periodic lattice. From the 56% transmitted power in the 5 degree grating, 20% is lost to diffraction to other angles. From (1615) and (1620) it is possible to see that there are distortions in the transmitted field. These distortions, mainly due to the low transmission amplitude of some of the meta-molecules and their phase errors result in the transmitted power being diffracted to other angles. Besides, it is seen that power loss to other angles both in reflection and transmission is higher for larger grating angles. This is due to the need for finer sampling of the wave front for waves with steeper angles. The lower efficiency for gratings with larger angles results in lower efficiency of lenses with higher numerical apertures which need bending light with larger angles.

Figure 15:
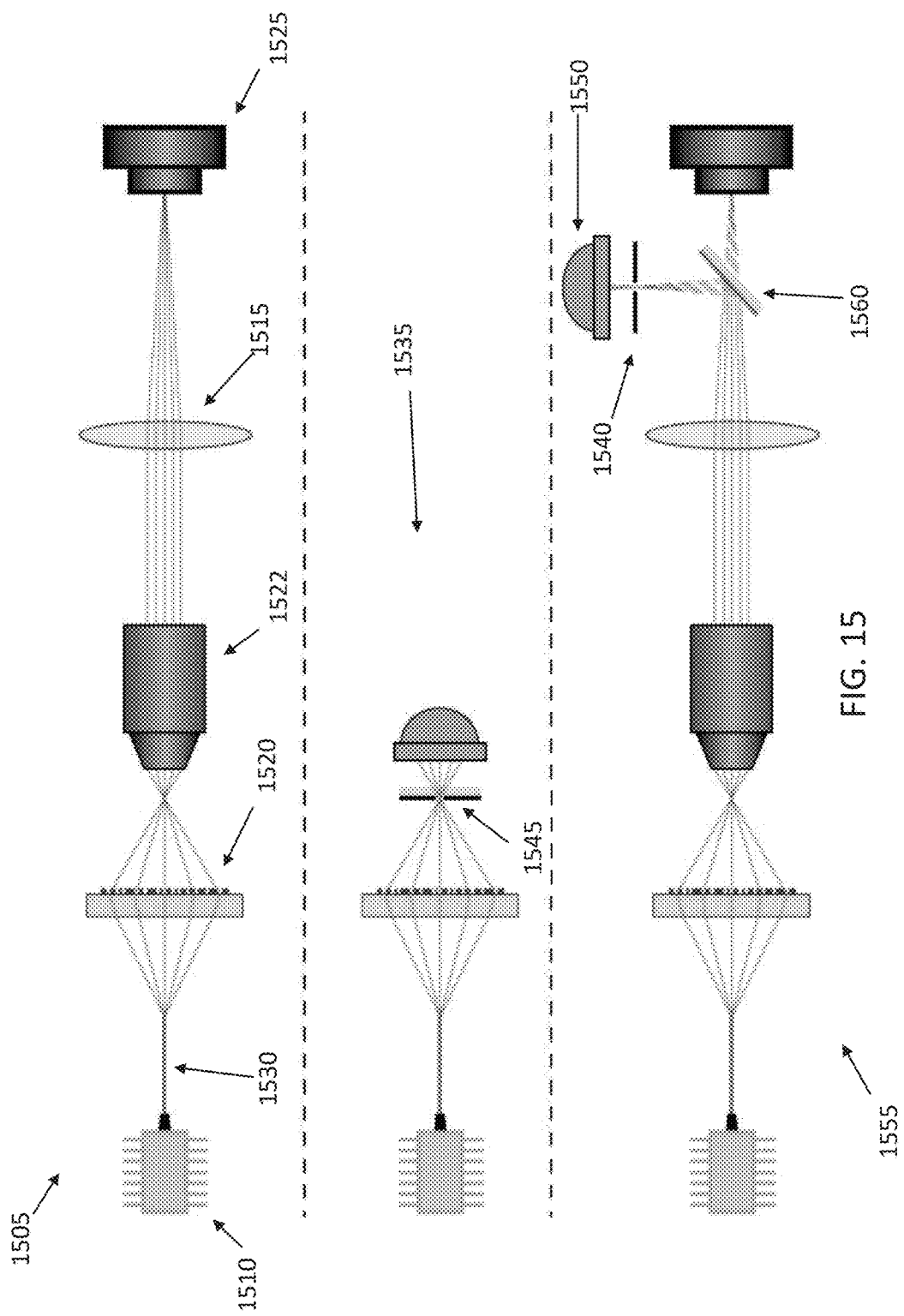
FIG. 15 illustrates an exemplary measurement setup.

FIG. 15 illustrates exemplary measurement setups. The measurement setup used to capture the focus pattern and the intensity distribution in different planes around focus is shown in (1505). The laser source (1510), fibers (1530), objective lens (1522), tube lens (1515), and camera (1525) were different in 915 nm and 1550 nm measurements of the metasurface (1520). The measurement setup for measuring the efficiency of the lenses at 915 nm using a 20 μm pinhole (1545) in the focal plane is illustrated in (1535). The setup for measuring focusing efficiency of the lens at 1550 nm using a 2 mm iris (1540) in the image plane of a 100× microscope is illustrated in (1555). An optical power meter (1550) and mirror (1560) are also used with the iris.

As visible in FIG. 12, in some embodiments the first plurality of scattering elements are each located at a center of a respective hexagon in a first plurality of hexagons and the second plurality of scattering elements are each located at a center of a respective hexagon of a second plurality of hexagons, wherein the first and second plurality of hexagons are arranged in a single hexagonal two-dimensional lattice and at least six hexagons of the second plurality of hexagons surround at least one hexagon of the first plurality of hexagons.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] A. Arbabi, Y. Horie, A. J. Ball, M. Bagheri, and A. Faraon, "Subwavelength-thick Lenses with High Numerical Apertures and Large Efficiency Based on High Contrast Transmitarrays," arXiv:1410.8261 [physics.optics], 2014.

[2] A. Arbabi, Y. Horie, M. Bagheri, and A. Faraon, "Complete Control of Polarization and Phase of Light with High Efficiency and Sub-wavelength Spatial Resolution," arXiv:1411.1494 [physics.optics], 2014.

[3] A. Arbabi, M. Bagheri, A. Ball, Y. Horie, D. Fattal, and A. Faraon, "Controlling the Phase Front of Optical Fiber Beams using High Contrast Metastructures," in CLEO: 2014.

[4] A. Arbabi, Y. Horie, M. Bagheri, A. Faraon, "Highly efficient polarization control using subwavelength high contrast transmit arrays," Proc. SPIE: 2015.

[5] A. Arbabi, Y. Horie, A. J. Ball, M. Bagheri, A. Faraon "Efficient high NA flat micro-lenses realized using high contrast transmit arrays," Proc. SPIE 2015.

[6] Astilean, S., Lalanne, P., Chavel, P., Cambril, E. & Launois, H. High-efficiency subwavelength diffractive element patterned in a high-refractive-index material for 633 nm. Opt. Lett. 23, 552-554 (1998).

[7] Lalanne, P., Astilean, S., Chavel, P., Cambril, E. & Launois, H., Design and fabrication of blazed binary diffractive elements with sampling periods smaller than the structural cutoff. J. Opt. Soc. Am. A 16, 1143-1156 (1999).

[8] Fattal, D., Li, J., Peng, Z., Fiorentino, M. & Beausoleil, R. G. Flat dielectric grating reflectors with focusing abilities. Nat. Photonics 4, 466-470 (2010).

[9] Lin, D., Fan, P., Hasman, E. & Brongersma, M. L. Dielectric gradient metasurface optical elements. Science 345, 298-302 (2014).

[10] Kildishev, A. V., Boltasseva, A. & Shalaev, V. M. Planar photonics with metasurfaces. Science 339 (2013).

[11] Yu, N. & Capasso, F. Flat optics with designer metasurfaces. Nat. Mater. 13, 139-150 (2014).

[12] Vo, S. et al. Sub-wavelength grating lenses with a twist. IEEE Photonics Technol. Lett. 26, 1375-1378 (2014).

[13] Arbabi, A., Horie, Y., Ball, A. J., Bagheri, M. & Faraon, A. Subwavelength-thick lenses with high numerical apertures and large efficiency based on high-contrast transmit arrays. Nat. Commun. 6 (2015).

[14] Arbabi, A., Horie, Y., Bagheri, M. & Faraon, A. Dielectric metasurfaces for complete control of phase and polarization with subwavelength spatial resolution and high transmission. Nat. Nanotechnol. 10, 937-943 (2015).

[15] Young, M. Zone plates and their aberrations. J. Opt. Soc. Am. 62, 972-976 (1972).

[16] Born, M., Wolf, E. & Bhatia, A. Principles of Optics: Electro-magnetic Theory of Propagation, Interference and Diffraction of Light (Cambridge University Press, 1999).

[17] Saleh, B. & Teich, M. Fundamentals of Photonics (Wiley, 2013).

[18] Latta, J. N. Analysis of multiple hologram optical elements with low dispersion and low aberrations. Appl. Opt. 11, 1686-1696 (1972).

[19] Bennett, S. J. Achromatic combinations of hologram optical elements. Appl. Opt. 15, 542-545 (1976).

[20] Sweatt, W. Achromatic triplet using holographic optical elements. Appl. Opt. 16, 1390-1391 (1977).

[21] Weingrtner, I. & Rosenbruch, K. J. Chromatic correction of two- and three-element holographic imaging systems. Opt. Acta 29, 519-529 (1982).

[22] Buralli, D. A. & Rogers, J. R. Some fundamental limitations of achromatic holographic systems. J. Opt. Soc. Am. A 6, 1863-1868 (1989).

[23] Swanson, G. J. Binary optics technology: the theory and design of multi-level diffractive optical elements. Tech. Rep., DTIC Document (1989).

[24] Wang, Y., Yun, W. & Jacobsen, C. Achromatic Fresnel optics for wideband extreme-ultraviolet and x-ray imaging. Nature 424, 50-53 (2003).

[25] Eisenbach, O., Avayu, O., Ditcovski, R. & Ellenbogen, T. Metasurfaces based dual wavelength diffractive lenses. *Opt. Express* 23, 3928-3936 (2015).

[26] Aieta, F. et al. Aberration-free ultrathin flat lenses and axicons at telecom wavelengths based on plasmonic metasurfaces. *Nano Lett.* 12, 4932-4936 (2012).

[27] Arbabi, A. & Faraon, A. Fundamental limits of ultrathin metasurfaces. *arXiv.org, e-Print Arch., Phys. arXiv:* 1411.2537 (2014).

[28] Aieta, F., Kats, M. A., Genevet, P. & Capasso, F. Multiwave-length achromatic metasurfaces by dispersive phase compensation. *Science* 347, 1342-1345 (2015).

[29] Khorasaninejad, M. et al. Achromatic metasurface lens at telecommunication wavelengths. *Nano Lett.* 15, 5358-5362 (2015).

[30] Zhao, Z. et al. Multispectral optical metasurfaces enabled by achromatic phase transition. *Sci. Rep.* 5, 15781 (2015).

[31] Cheng, J. & Mosallaei, H. Truly achromatic optical metasurfaces: a filter circuit theory-based design. *J. Opt. Soc. Am. B* 32, 2115-2121 (2015).

[32] Oskooi, A. F. et al. Meep: A flexible free-software package for electromagnetic simulations by the fdtd method. *Comput. Phys. Commun.* 181, 687-702 (2010).

[33] Liu, V. & Fan, S. S4: A free electromagnetic solver for layered periodic structures. *Comput. Phys. Commun.* 183, 2233-2244 (2012).

What is claimed is:

1. A structure comprising:
   a substrate;
   a first plurality of scattering elements on the substrate, the first plurality of scattering elements having first geometrical dimensions for the scattering elements; and
   a second plurality of scattering elements on the substrate, the second plurality of scattering elements having second geometrical dimensions for the scattering elements, the second geometrical dimensions being different from the first geometrical dimensions,
   wherein the first plurality of scattering elements are arranged in first four sectors and the second plurality of scattering elements are arranged in second four sectors spatially separated from the first four sectors.

2. The structure of claim 1, wherein the first plurality of scattering elements has a first spacing between scattering elements and the second plurality of scattering elements has a second spacing between scattering elements, the second spacing being different from the first spacing.

3. The structure of claim 1, wherein the substrate is transparent to light, the first plurality of scattering elements is configured to focus light at a first wavelength, and the second plurality of scattering elements is configured to focus light at a second wavelength different from the first wavelength.

4. The structure of claim 3, wherein the first wavelength is 775 nm and the second wavelength is 1550 nm.

5. The structure of claim 1, wherein the first and second four sectors are consecutive octaves of a circular substrate.

6. The structure of claim 1, wherein the first and second pluralities of scattering elements are arranged as alternating circular rows on the substrate.

7. The structure of claim 1, wherein the scattering elements are circular, the first plurality having a first diameter and the second plurality having a second diameter.

8. The structure of claim 1, wherein the scattering elements are made of amorphous silicon and have a height less than 1 micrometer, and the substrate is made of fused silica.

9. The structure of claim 8, wherein the substrate and the first and second plurality of scattering elements form a lens having a 100 µm diameter and a 50 µm focal distance.

10. The structure of claim 1, wherein the scattering elements are elliptical.

11. The structure of claim 10, wherein the elliptical scattering elements of the first and second pluralities have varying orientation on the substrate.

12. The structure of claim 1, wherein the first and second plurality of scattering elements are arranged in a hexagonal lattice.

13. The structure of claim 1, wherein the first plurality of scattering elements are each located at a center of a respective hexagon in a first plurality of hexagons and the second plurality of scattering elements are each located at a center of a respective hexagon of a second plurality of hexagons, wherein the first and second plurality of hexagons are arranged in a single hexagonal two-dimensional lattice and at least six hexagons of the second plurality of hexagons surround at least one hexagon of the first plurality of hexagons.

14. A structure comprising:
    a substrate;
    a first plurality of scattering elements on the substrate, the first plurality of scattering elements having first geometrical dimensions for the scattering elements;
    a second plurality of scattering elements on the substrate, the second plurality of scattering elements having second geometrical dimensions for the scattering elements, the second geometrical dimensions being different from the first geometrical dimensions; and
    a third plurality of scattering elements on the substrate, the third plurality of scattering elements having third geometrical dimensions for the scattering elements, the third geometrical dimensions being different from the first and the second geometrical dimensions.

15. A method comprising:
    providing a substrate;
    fabricating a first plurality of scattering elements on the substrate according to first geometric dimensions, to scatter light at a first wavelength; and
    fabricating a second plurality of scattering elements on the substrate according to second geometric dimensions, to scatter light at a second wavelength,
    wherein:
    the first geometric dimensions are different from the second geometric dimensions, and the first wavelength is different from the second wavelength, and
    the first plurality of scattering elements are arranged in first four sectors and the second plurality of scattering elements are arranged in second four sectors spatially separated from the first four sectors.

16. The method of claim 15, wherein the first plurality of scattering elements is to focus light of the first wavelength at a first focal distance, and the second plurality of scattering elements is to focus light of the second wavelength at a second focal distance, the first focal distance different from the second focal distance.

17. The method of claim 15, wherein the first plurality of scattering elements is to focus light of the first wavelength at a first focal distance, and the second plurality of scattering elements is to focus light of the second wavelength at the first focal distance.

18. The method of claim 15, where the first and second pluralities of scattering elements are co-designed to focus light at the first and second wavelengths at a same focal distance.

* * * * *